US010324591B2

(12) United States Patent
Room

(10) Patent No.: US 10,324,591 B2
(45) Date of Patent: *Jun. 18, 2019

(54) SYSTEM FOR CREATING AND RETRIEVING CONTEXTUAL LINKS BETWEEN USER INTERFACE OBJECTS

(71) Applicant: BRIDGIT, S.P.C., Oakland, CA (US)

(72) Inventor: David Room, Oakland, CA (US)

(73) Assignee: BRIDGIT, S.P.C., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,024

(22) Filed: Jul. 9, 2018

(65) Prior Publication Data

US 2019/0065011 A1  Feb. 28, 2019

Related U.S. Application Data

(60) Provisional application No. 62/551,057, filed on Aug. 28, 2017.

(51) Int. Cl.
| | |
|---|---|
| G06F 3/0482 | (2013.01) |
| G06F 17/22 | (2006.01) |
| G06F 9/451 | (2018.01) |
| G06F 16/958 | (2019.01) |
| G06F 16/954 | (2019.01) |
| G06F 16/903 | (2019.01) |
| G06F 3/0481 | (2013.01) |
| G06F 3/0484 | (2013.01) |
| G06F 17/24 | (2006.01) |
| G06F 8/38 | (2018.01) |

(52) U.S. Cl.
CPC .......... G06F 3/0482 (2013.01); G06F 3/0484 (2013.01); G06F 3/04812 (2013.01); G06F 8/38 (2013.01); G06F 9/451 (2018.02); G06F 16/90348 (2019.01); G06F 16/954 (2019.01); G06F 16/972 (2019.01); G06F 17/2235 (2013.01); G06F 17/241 (2013.01); G06F 3/04842 (2013.01)

(58) Field of Classification Search
CPC ..... G06F 3/0482; G06F 9/451; G06F 17/2235
See application file for complete search history.

(56) References Cited

U.S. PATENT DOCUMENTS

| | | | | |
|---|---|---|---|---|
| 6,122,647 A * | 9/2000 | Horowitz | .......... | G06F 17/30873 707/999.003 |
| 7,185,274 B1 * | 2/2007 | Rubin | ................ | G06F 17/2235 707/E17.013 |
| 7,432,938 B1 * | 10/2008 | Reuter | ................ | G06F 17/2235 345/418 |

(Continued)

Primary Examiner — Andrea N Long
(74) Attorney, Agent, or Firm — Rowan TELS LLC

(57) ABSTRACT

A method for operating a system for creating and retrieving contextual links between user interface objects involves displaying a navigation options menu as an overlay, above a content source, within a user interface, in response to receiving an input control through a UI controller for a UI object, generating an annotation entry for the UI object, generating a contextual link between a first UI object and a second UI object, and displaying an adjacently positioned link counter and a visible indicator around the UI object through operation of a presentation modeler, in response to detecting at least one correlation for the UI object in the correlation table.

11 Claims, 20 Drawing Sheets

(56) References Cited

U.S. PATENT DOCUMENTS

| | | | |
|---|---|---|---|
| 10,263,877 B1* | 4/2019 | Ie | H04L 43/16 |
| 2006/0143559 A1* | 6/2006 | Spielberg | G06F 3/165 |
| | | | 715/201 |
| 2010/0153835 A1* | 6/2010 | Xiong | G06F 17/2247 |
| | | | 715/230 |
| 2011/0022942 A1* | 1/2011 | Flemings | G06F 17/30899 |
| | | | 715/230 |
| 2012/0047119 A1* | 2/2012 | Kandekar | G06F 17/30849 |
| | | | 707/705 |
| 2012/0151346 A1* | 6/2012 | McClements, IV | |
| | | | G06Q 10/101 |
| | | | 715/716 |
| 2013/0246901 A1* | 9/2013 | Massand | G06F 17/24 |
| | | | 715/229 |
| 2015/0248387 A1* | 9/2015 | Mattingly | G06F 17/241 |
| | | | 715/230 |
| 2015/0278169 A1* | 10/2015 | Vanderport | G06F 17/2235 |
| | | | 715/208 |
| 2017/0060829 A1* | 3/2017 | Bhatt | G06F 17/241 |
| 2017/0308511 A1* | 10/2017 | Beth | G06F 17/2235 |

\* cited by examiner

FIG. 16

SYSTEM FOR CREATING AND RETRIEVING CONTEXTUAL LINKS BETWEEN USER INTERFACE OBJECTS

CROSS REFERENCE TO RELATED APPLICATIONS

This application claims the benefit of U.S. provisional patent application Ser. No. 62/551,057, filed on Aug. 28, 2017, the contents of which are incorporated herein by reference in their entirety.

BACKGROUND

People are able to see and interact with a virtually infinite amount of information through the Internet. They are able to navigate the web by following links between pages and search engines. Unfortunately, current search algorithms rely on previous searches and search results to determine relevance to most links without providing any context for why the links presented are relevant. Thus, the paths available to a user are based on the relationships and interests of the webmaster and search results that reflect among other things popularity based on website links and relevance based on search engine optimization (SEO) metadata. As a result, these existing systems carry an inherent bias against the presentation of new content and content without effective SEO metadata making the integration with existing content difficult. Due to the nature of these systems, users are not able to meaningfully share their understanding of information, to navigate the web in a way that inherently builds their understanding, to observe their decision making processes and biases, or to come to consensus or agreement with other web users. Therefore, a need exists for a system that provides categorization, ranking, and context to links created between content, and establishes a basis for retrieving and curating relevant content and links to other content.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 16 illustrates a user interface 700 in accordance with one embodiment.

DETAILED DESCRIPTION

Figure 1:
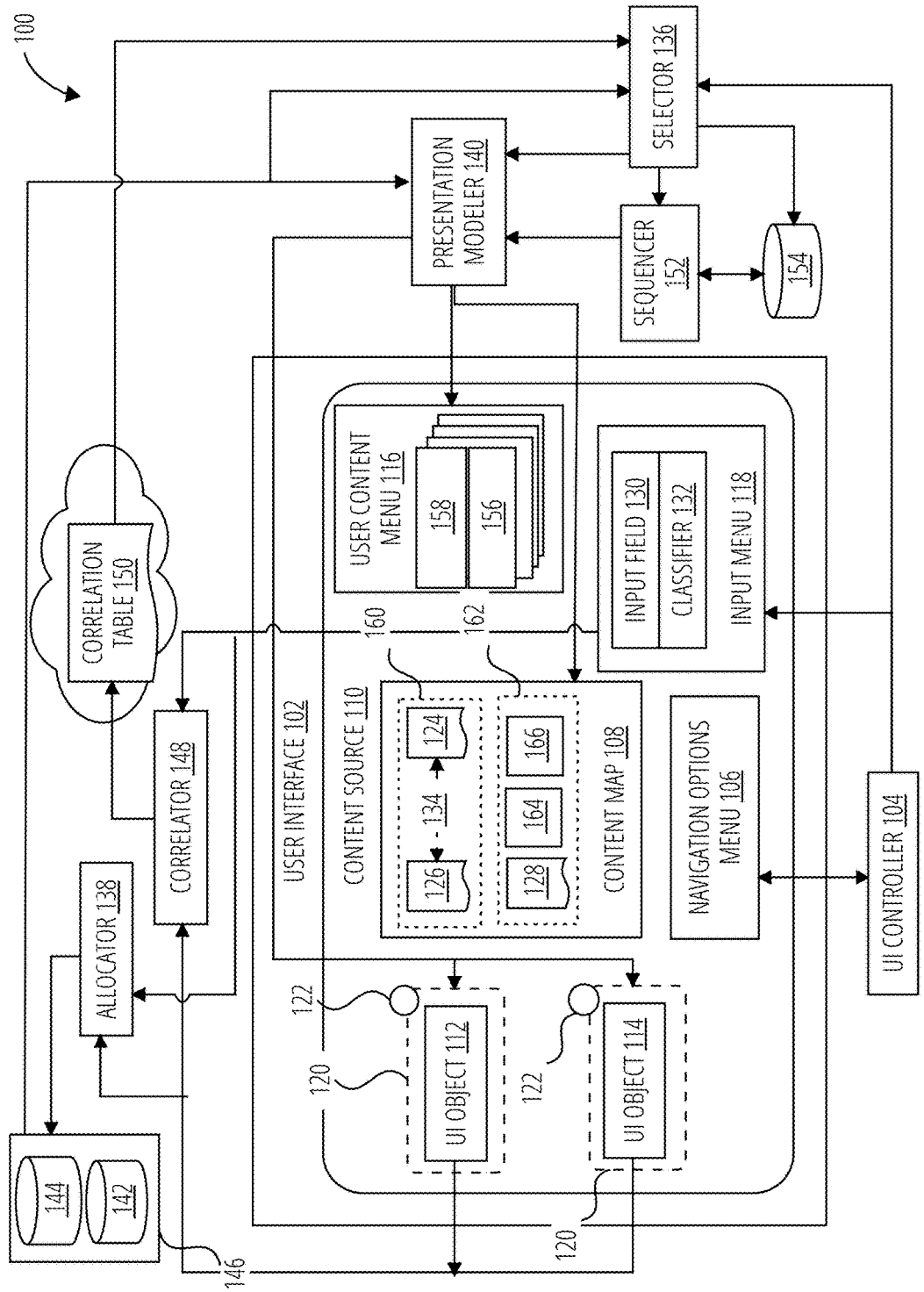
FIG. 1 illustrates a system 100 in accordance with one embodiment.

"Sequencer" in this context refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++. Other examples of hardware and software or firmware sequencers will now be readily apparent to those of skill in the relevant arts.

"Correlator" in this context refers to a logic element that identifies a configured association between its inputs. One example of a correlator is a lookup table (LUT) configured in software or firmware. Correlators may be implemented as relational databases. An example LUT correlator is: |low_alarm_condition |low_threshold_value|0| |safe condition |safe_lower_bound |safe_upper_bound| |high_alarm_condition|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Selector" in this context refers to a logic element that selects one of two or more inputs to its output as determined by one or more selection controls. Examples of hardware selectors are multiplexers and demultiplexers. An example software or firmware selector is: if (selection_control==true) output=input1; else output=input2. Many other examples of selectors will be evident to those of skill in the art, without undo experimentation.

"User interface (UI) object" in this context refers to text, images, video, and/or other forms of content displayable through a user interface. For example, a UI object may be a word, sentence, and/or paragraph, an image file, or a video displayed through a user interface.

The system for creating and retrieving contextual links between user interface (UI) objects provides a user interface operating on a device and may be accomplished by a browser plugin, a browser, or an application with browser capabilities. During the course of web browsing, a user may select a UI object (e.g., text, image, video, etc.) in the user interface, display a navigation options menu with options to create a link to the selected UI object, ask a question about the UI object, and/or view content and link descriptions associated with the selected UI object. Depending on the selected option, the user may be presented with a text field input to select a type of link and enter a description of the link between the selected UI object and another UI object. Additionally, options may be presented to the user to link the selected UI objects to previously selected UI objects, to add the UI object to a queue where it may be linked to another UI object at a later point during the user's browsing session, or to add the UI object to a queue for validation by other users. Prior to submittal the user may also be presented with suggestions for how to improve the link. Furthermore, the text field may be presented for the user to enter a question regarding the selected UI object. The question would be used to retrieve results based on similar questions asked by other users as well as answers to those questions. In addition, the user may be presented with options to view follow up questions asked by other users after their questions were answered. The selected options would present the user with a content map showing the selected UI object with a link description to another UI object from a different source (e.g., web page, database, etc.) allowing the user to explore existing relations created by other users.

The user may make links to and among not only multimedia UI objects but also specific segments of text, graphics, audio and video.

The system for creating and retrieving contextual links between user interface (UI) objects may register new links created by a user into a distributed database, such as a blockchain. A blockchain style distributed database may be used to maintain a continuously growing list of records as block units. Each block contains a timestamp and a link to a previous block. The blockchain would be managed through a peer-to-peer network collectively adhering to a protocol for validating each new block. By design, blockchains are inherently resistant to modification of the data. Once recorded, the data in any given block cannot be altered retroactively without the alteration of all subsequent blocks and a collusion of the network majority. For a given UI object, however, new blocks may reflect edits (i.e., "edit blocks") to the original block, and the edited link information may be displayed to the users. Indications of the differences between the edit blocks and the original block as well as indications of whether other links to the block content were made before or after the edit blocks were recorded may also be displayed. Contributors may indicate that the other links continue to be relevant after the edit blocks have been recorded, update their link information, or delete the link. Through the use of a block chain system, a link creator could receive the system's cryptocurrency or credits for each link and other content submissions (e.g., translations, multimedia transcriptions, inquires, perspectives, claims, evidence, and data) that may be redeemed for other cryptocurrency or cash based on the value created by the submission in the system, which could be funded by access fees, sponsorship, advertising, etc.

A method for operating a system for creating and retrieving contextual links between user interface (UI) objects involves displaying a navigation options menu as an overlay, above a content source, within a user interface, in response to receiving an input control through a UI controller for a UI object. The method further involves generating an annotation entry for the UI object, generating a contextual link between a first UI object and a second UI object, and displaying an adjacently positioned link counter and a visible indicator around the UI object through operation of a presentation modeler, in response to detecting at least one correlation for the UI object in the correlation table.

The process of generating an annotation entry for the UI object involves displaying an input menu as an overlay, above the content source, within the user interface, in response to detecting an annotation control within the navigation options menu, receiving at least one user content control and a link classification through the input menu, storing the UI object within UI content storage and at least one user content control and the link classification as the annotation entry within link description storage through operation of an allocator, and correlating the annotation entry and the UI object within a correlation table through operation of a correlator.

The process of generating a contextual link between a first UI object and a second UI object involves storing the first UI object in the UI content storage through operation of the allocator, in response to detecting a first link control through the navigation options menu, storing the second UI object in the UI content storage, through operation of the allocator, and displaying the input menu, in response to detecting a second link control through the navigation options menu, storing a contextual link description in the link description storage, through operation of the allocator, in response to receiving the at least one user content control and the link classification from the input menu, correlating the contextual link description, the first UI object, and the second UI object in the correlation table through operation of the correlator.

The method for operating a system for creating and retrieving contextual links between user interface objects may also involve displaying a content map as an overlay, above the content source, in the user interface by receiving a content map control for the first UI object through the UI controller, configuring a selector with the content map control to identify correlations associated with the first UI object in the correlation table, retrieving UI objects from the UI content storage, and annotation entries and contextual link descriptions from the link description storage, and generating the content map comprising the contextual links and annotations. The contextual links each comprise the first UI object, the second UI object, and the contextual link description. The annotations each comprise the first UI object and the annotation entry.

The method for operating a system for creating and retrieving contextual links between user interface objects may also involve displaying a user content menu as an overlay, above the content source, in the user interface by receiving a user content menu control for the UI object through the UI controller, configuring a selector with the user content menu control to identify annotation entries associated with the UI object in the correlation table, retrieving the annotation entries from the link description storage, generating a presentation order for the annotation entries using the link classification through operation of a sequencer, displaying at least one annotation entry, of the annotation entries, within the user content menu through operation of the presentation modeler configured by the presentation order.

In some configurations, the sequencer may utilize historic interactions for selecting UI objects from the UI content storage and previous presentation orders to generate a current presentation order for the annotation entries in the user content menu.

In some configurations, the second UI object may be selected from a second content source.

The link counter may display the number of correlations associated with the UI object in the correlation table.

In some configurations, the visual indicator around a UI object may be hidden to the user while browsing the content source until the user's focus (e.g., pointer location, eye positioning, etc.) is detected near the UI object. Once the user's focus is detected nearby, the visual indicator may be presented around the UI object. Furthermore, when the user's focus is detected on the UI object for a predetermined period of time, the associated content and annotations may be presented to the user. The user may be able to exit out of the associated content and annotations by selecting a "close" button or by moving their focus away from the displayed content.

In the method for operating a system for creating and retrieving contextual links between user interface objects, the UI object may be a text string, an image, an area of the content source as displayed in the user interface, and/or an area of the content source as displayed in the user interface at an instance or interval during the playback of a video or audio. In some configurations, the correlation table is stored remotely on the cloud.

In some configurations, the system may provide feedback while the user is creating an annotation entry or contextual link, or immediately following submission of the annotation entry or contextual link, advising the user that a previous entry is present that contains the same or similar user content as the current submission. The system may compare the user content to previous user content entries stored in the link description storage to limit or eliminate redundant entries.

Users may be able to make annotations on content and links, as well as indicate their support or upvote for links, flag links for irrelevancy, and flag links, UI objects, and comments for inappropriate content. Users may also be able to indicate their non-support or downvote links, UI objects, and comments.

Users may be able to initiate online chat or live conversations through text, audio, or video about links, UI objects, and decision objects. These chat or live conversations can be associated with multiple links, UI objects, and decision objects, so that a single conversation can occur seamlessly in multiple locations on the web.

The classifier may be operated to identify a text string received through the user interface, configure a selector with the text string, and store the text string in a link description storage. The correlator may be operated to generate a contextual link between a second UI object and the first UI object in a correlation table and associate a link description to the contextual link in the correlation table. The selector may be operated to select link descriptions and second UI objects for the first UI object in the correlation table and select the link descriptions and the second UI objects for the text string in the correlation table. The selector may be operated to select the link descriptions and the second UI objects in response to receiving a selection control from a navigations options window. The selector may be operated to select the link descriptions and the second UI objects in response to receiving a selection control from an exploration options window.

The method may involve configuring a sequencer with the correlation table to order the link descriptions and the second UI objects for the presentation modeler. The presentation modeler may be operated to display an exploration options window comprising a view similar/related questions option, a view answers option, and a view follow up questions option.

Furthermore, the system may provide access to third party content through the use of plugins or access to certain internet based content services such as SOUNDCLOUD®, SPOTIFY™, AUDIBLE™, YOUTUBE™, VIMEO™, etc., allowing for seamless integration between those services that may obscure or change the location of their UI objects over time.

The system may be operated utilizing a device executing software that allows the reader to detect sentences, block of sentences, and sets of sentences and images on the web that are character-string or image-based markers, and thereby enabled for interactions. The user may also place character-string and/or image based markers using software to identify one or more (potentially non-contiguous) sentences, paragraphs, or graphic elements to enable for interactions, thereby displaying a notes widget that enables them (and others) to make/read notes, comments, and linkages on notes, as well as a communication widget to find/organize private or public video, audio, or written conversation associated with the marker. The notes widget displays a sorted list of the notes, including those with linkages between other content accessible to the user. Notes may be sorted, for example, by ranking, tastes of similar users, AI, type of comment, new comments, network, and group, or the user may elect to see only their own comments or those of specific people in their network. Indicators make it clear that the notes widget and communication widget are associated with the specific marker text. The user may swipe through the ordered set of displayed comments utilizing an augmented reality (AR) or virtual reality (VR) enabled device. In some configurations utilizing AR/VR devices (e.g., AR/VR headsets), the system may receive an input control indicating the selection of a displayed UI object based on the position and/or direction a user's eye. The AR/VR device may include eye tracking optical sensors that correlate the position of a user's eye with a particular object and detect the duration that their eye is focused on the particular UI object as an indication of an input control. Other methods for detecting user inputs (e.g., input controls) may also be utilized in other systems such as, but not limited to, gesture inputs, voice inputs, haptic inputs, and combinations thereof.

In the case the marker text may be used as part of a non-contiguous group of text, the user may have the option to display notes for any of the markers or all of them. The user may have the option to post comments on existing notes and post new notes associated with the marker, and to add content linkages to notes. The user may organize/participate in public or private multi-user voice calls, audio calls, or chats. The community may be configured to monitor the content for appropriateness and flag content as needed. In some instances, when looking at the notes associated with a marker, the user may interact to display a prioritized list of more notes, e.g., notes like this one, notes by friends, or high ranking notes.

The user may also drag the notes/comments/conversations that they may want to come back to and place them in their digital parking lot or3D digital whiteboard or workspace. This digital space may be private, and may be searchable by content, author, title, etc. Once the user has interacted with the content, they may move on to new marker texts, to find out more interactions, restarting the process.

User behavior may be collected by the system, for optimization of the system, and other uses. The user may also link other books, quizzes, quotes, contests, reviews, notes, events etc., to a marker. The user may link marker texts to notes, comments, and communication in other books. The user may upvote/downvote notes, comments and conversations and tag their own notes and conversations. Users may use the system in the context of research, developing their understanding of a topic and how they think, and evaluating and making community decisions.

The system may be utilized to help users view differing points of view by analyzing the context links between objects and classifying them as being similar or opposing viewpoints for the selected UI object. The presentation of this content may provide a user experience design similar to a tree structure showing opposing viewpoints branching away from a center point with links to supporting content or arguments. This may allowing a user to explore the topic from different points of view.

The system may help users see how they and others are thinking and help people understand the complexity of a particular issue. Furthermore, the system may help people understand why they disagree, see their blind spots, understand their confirmation bias, and make better decisions/choices.

Additionally, the system may include metrics in the following categories: truth quotient (scale), confirmation bias, bias, conflict of interest, comparisons, user activity, question validity, and statement prevalence (i.e., talking points). Users may see how statements/questions are connected, which may lead to more learning. The system may support freethinking, participate in decision-making, and understanding of the collective mind. Users may invite experts to weigh in. Users may rate their experts, follow them, and follow each other. Questions/statements may be posted to social media.

Furthermore, the system may be implemented for use in citizen deliberative councils; online citizens' jury; planning cells involving a number of simultaneous juries (or "cells"), each with about 25 members, all of whom are considering the same issue; citizen consensus councils; consensus conferences; and citizens' assemblies.

The linkages to Internet sources may capture the static representation or live data. Static representations may be updated by the admin, the community, and/or the user. The system stores the timestamp for static views, last accessed live views, and updates. The user may have the ability to view the initial static, updated static, and live views.

The system may store information and provide decision context for many domains that involve many sources of content and data such as but not limited to legal debates, community decision making, learning subjects, researching subjects, literature reviews, proofs, analysis of thinking and biases, decision analysis, risk mitigation, product development, corporate decision making, developing marketing plans, story design and analysis, artificial intelligence, sports draft choices, project management and evaluation, reviewing performance videos, analysis of differences in beliefs and groupthink, education, psychological analysis, sociological analysis, political analysis, biological analysis, chemical analysis, engineering analysis, design processes, book/film/music reviews and analysis, criminal investigations, system design, business model canvas, etc. The system may also be used to frame and execute an inquiry, spotlight inconsistencies, cull bad data, and compare products and other types of choices. The system may have or enable the configuration or development of tailored processes and views for such above uses.

Questions, topics, and inquiries may have a dashboard that summarizes associated activity. This could include a partially collapsed tree like structure that shows the links between UI objects associated with the question, topic or inquiry.

These activities may include a number of modes of use:
  Discovery—search or browse content, content linkages, and decisions.
  Exploration—following linkages or drilling down on decisions.
  Build—user creates linkages between content.
  Organize—organize a decision process.
  Participate—participate in decision-making process.
  Moderate—see moderation roles below.

Community members may be able to take on roles/activities as volunteers such as moderating links and content, moderating process and logic, fact checking, reconciling inconsistencies, identifying shills, automated responses, and identifying fake information. There could be compensation for these roles based on the value provided to the system. These roles could be opt-in or may require approval by others such as system admins, moderators, or relevant segments of the larger community. Roles could also be compensated with credits or cryptocurrency as appropriate based on the value they are creating in the system.

There may be an auto-moderation process or partial auto-moderation process that evaluates whether the user's input adheres to any specific rules for the type of input that may be submitted. The auto-moderation process may be able to be modified for specific topics, inquiries, or decisions. If the user input is rejected by the auto-moderation process, the user will be notified. If the user input is approved, it will become live in the system.

There may be a verification process for users that includes an email verification process, photograph of identification card, blockchain verification of identity, and/or other methods of verifying one's identity. Elements of the verification process may be optional. Verified users may be listed on the application. In some instances, users may be compensated in cryptocurrency for verifying their identity.

The system may incorporate a visual search algorithm that returns search results with rows of rectangular and square shapes whose size, position, color, and/or shape may convey the popularity, recency, category of result, and/or relevancy of the items. For example, items on the top row may be more relevant, larger items may be more popular, light blue tinted shapes may be inquiries, and rectangles may be more recent. The results could be displayed as a combination of text, images, and/or videos as appropriate based on their nature.

Additionally, linkages may be made to relevant products and services. Such linkages may be done by unaffiliated users and/or representatives for the products and services. There may be a cost for linking products and/or other methods for preventing abuse by representatives for the products and services. Product and service spam could be flagged by the community and reviewed by moderators for abuse.

The system for creating and retrieving contextual links between user interface objects may be configured to operate in an enterprise setting, where corporations/organizations may set up their own private annotation, linking, and communication service as a structure for or a view into their internal knowledge base and/or for decision making.

Users have profiles that include various data about the user's attributes and preferences. The profiles have granular settings for privacy, which enable the user to choose what information to divulge under which circumstances.

Users may follow users, UI objects, links, decision objects, decisions, topics, and other elements. The system may send notifications to users when links, decision objects, decisions, topics, and other elements they are following are modified or a user creates or modifies content. Content creators may also be notified when the underlying UI objects have changed. The system may also need to let users know if the underlying content changes to some extent and if the link becomes broken because of the change in content. In some instances, the system may incorporate the concept of domain managers who would also be notified when things break. They are also responsible for monitoring and improving the content in a domain. They may be rewarded with cryptocurrency for this. They may be required to pay for the right to be a domain manager.

Users may share UI objects, links, decision objects, decisions, topics, and other elements on social media, through apps, and on email. Users may invite others to participate in, for example, decision processes, inquiries, topical discussions via social media, through apps, and on email.

Users may create a landing page for decision-making processes (e.g., citizens' council for a community issue), questions/inquires, issues/topics, and potentially assign moderators.

If the linkage may be related to a decision-making process or an issue, meta-data could indicate what stage of the thinking process the linkage addresses:
  Information: This may be the stage of knowledge, grammar, and inputs. Related metadata may indicate the type of information: e.g., who, what, why, when, and how.
  Meaning: This may be the stage of understanding, processing, and logic. Related metadata may indicate the nature of the processing: e.g., numbers, form, timing, and movement.
  Integration: This may be the stage of wisdom, outputs, and rhetoric. Related metadata may indicate the outcomes: e.g., do nothing, potential action, further research, thought experiment, and statements.

There may be other ways of structuring the decision-making process as well. For example, the user could create objects for decision-making (decision objects), including inquires, perspectives, claims, evidence, and data. Users could link multiple perspectives to each inquiry. Users could link multiple claims to each perspective. Users could link multiple instances of evidence to each claim. Users could link multiple data to each instance of evidence. There may be specific requirements for a decision object (e.g., a perspective or a claim) to become active in the system. For example, a perspective may require at least one claim and a claim may require at least one piece of evidence for the perspective (and the claim) to be active. If the decision object is inactive, it may only be visible to the user or members of a group, it may appear grayed out, or in some other way be identified as being inactive.

The system for creating and retrieving contextual links between user interface objects may provide user sharing and interactions, enabling users to link content, provide metadata about the linkage, and write notes about the linkage. The system provides a database of linkages between content by crowd sourcing from Internet and mobile users, book readers, and product users. The system provides new ways to discover content, by presenting a prioritized list of information about linkages between content based on interests, demographics, contextual relevancy, reputation, and privacy.

The system may also collect demographics about the user, such as gender and age, as well as behavioral information, such as which apps they have installed, their web searches, etc., and utilize the information to generate a user profile to enhance the user experience (UX) according to the utilization. Furthermore, the system may gather information from different external sources, to continue to enhance the initial and later sharing and interactions. Social interactions started or received by the user as well as user browsing activity, may also be a source of information to continue the improvement of the UX.

In some configurations, the system may provide web site owners with information about how people are interacting with content elements on their page based on their interactions with the annotation system.

The system may be used to do polls and quizzes. The user may create poll or quiz objects to which questions are linked. The system may also be used to structure online courses by creating a course object to which lessons are linked, and lessons to which content may be linked. The same polls and quizzes may be linked to multiple UI elements and the answers aggregated.

In some configurations, the first UI object, the second UI object, and link descriptions, may be stored as hashed content. The hashes may be recorded in a ledger that tracks changes and modifications to each item.

In some configurations, the system for creating and retrieving contextual links between user interface objects may operate a dashboard interface menu where users are able to track their content links. Some options available to the user through the dashboard include, but are not limited to, an alert system notifying the user when user responses are submitted to their questions or when new content links are created from a particular UI object, organization options such as the creation of lists and/or collections of contextual links, the ability to submit/receive direct links to a contextual link, creation of collaboration requests to send to other users to access the contextual link, designating specific user access to view or edit contextual links, display configurations allowing a user to modify the color or style of the highlights based on their preference, and allowing the users to set up a profile to share their contextual links with other users.

The system may provide direct integration with other platforms (e.g., YOUTUBE™, STEEMIT™, TWITTER™, SLACK™) and platform specific applications that allows for the creation of contextual links within the platform/platform specific application. The system may create native apps for other platforms (e.g., TWITTER™, YOUTUBE™, and STEEMIT™) that allow their content to be contextually linked and to contextually link from their platform. Furthermore, the system may allow communication of content through existing email protocols, as well as any capable messaging system.

The system may create contextual links with distributed ledger entries, private data services behind paywalls, PDFs, anonymous bulletin boards, document collaboration platforms like DROPBOX™, products, geolocation, virtual reality, augmented reality, extended reality, messaging apps, and app and social media posts (e.g., tweets). Some use cases of data that could be published to distributed ledgers include contracts, transactions, identities, property, automobiles, and others that are being worked on in the era of the decentralized web.

In some configurations, the system may provide the option to create teams managed by an admin who may be able to view, which individuals within the team have viewed or worked with the contextual links created by the team members.

In some instances, users may attach an anonymous message stream to any content element.

In some configurations, the system may implement a reward system for curating the contextual links. The system may utilize a token system where users are rewarded with a token by reviewing, verifying, and editing contextual links. The system may implement some machine learning algorithms to verify that the reviewing and editing was performed in order to prevent click fraud. The tokens may be redeemable for other services associated with the platform. A machine-learning algorithm may create a pool of potential contextual links that users could validate and channel their earnings to a charity of their choice or to their own account. Contextual link holders may buy advertisers' products using tokens.

In some instances, the platform may organize bounties/contests for finding or creating the best contextual link based on the best supports, best refutes, most impact, most visited, or most upvoted.

The system may offer web-authoring plugins such as a WORDPRESS™ plugin, SHOPIFY™ plugin, and JavaScript library that may be implemented by the web page owner. If implemented, any browser may see the system links without a browser plugin. The site owner may get a referral fee for users that join the network from their site. If they enable ads to some extent, they may get a percentage of the click fees that result.

In some configurations, any site (or featured person on a site) may accept donations in tokens from web browsers. The featured person/project may set up donations even without the permission of the web owners. After following a contextual link, a user may be prompted to upvote the contextual link that brought them to a site. A proof of brain algorithm may look at both the upvotes and click-throughs and may look at the ratio of upvotes/click-throughs to determine the allocation of tokens as a form of incentive for upvoting/clicking through the site. The proof of brain algorithm is a type of token rewards algorithm that encourages people to create and curate content, it enables tokens to be distributed by "upvotes" and "likes" based algorithms and can be integrated with websites to align incentives between application owners and community members.

The system may be able to certify the supply chain of media (text, image, video, audio) by cryptographically tracking all parts of the creation to ensure its provenance and accuracy. In some configurations, the system may provide a certification seal that indicates that that the media has been certified and all of its constituent parts are known and verified.

In some configurations, the system tools for videos could also include multiple playback options (limit the length of clips) that are compliant with copyright and YOUTUBE™ policy so that users don't get strikes for playing videos. In the system video control, in the info bar, there may be a field that has the updated number of links that may be expanded to show the links associated with that moment. Each link may optionally include a region of the video.

The system may provide developer kits that enable companies to create their own overlay objects (like contextual links and notes) and specify how they are displayed. They may also have a separate presence. In some configurations, certain applications may utilize a software development kit (SDK) or application programming interface (API) to access the network data in their applications.

In some configurations, an advertiser's portal may drill down to see the content to which their programmatic ads may attach. They may optimize by taking some content elements out of the rotation or tailor their headline. They may tailor the ad copy based on aspects of the system user's profile. The system may show the user specific featured ads based on aspects of the user's profile. Additionally, targeted ads may be served to users based on the content and/or UI object that the user is currently focusing on as well as, in some cases, the content that the user has viewed previously. The system may also determine targeted ads to serve to the users utilizing a plurality of behavior metrics collected during the users' interaction with the system and may determine a particular ad to serve to the users from a pool of available ads associated with the content and/or UI object that the user is viewing.

In some configurations, users may be able to create conceptual links, notes, and other overlay content for overlapping UI elements. With respect to overlapping text, images, videos, or audio, users may be limited to selecting new UI elements within or encompassing the UI element but not crossing the border of any UI element.

In some configurations, the system may evaluate whether a web page can support overlays and prevent overlay content from being attached to pages that cannot support overlays. The system may determine whether a webpage supports overlays based on the type of content (e.g., live streaming video, content rating, etc.,), specific HTML code, CSS, JavaScript, and/or supported extensions and code, running on the webpage (for example, Flashy). The system may also provide information to the web site owner that shows them the problems with their site and gives them support or instructions on how to alter their web page so that it can support overlays.

Referencing FIG. 1, a system 100 for creating and retrieving contextual links between user interface objects includes user interface 102, a presentation modeler 140, a sequencer 152, a selector 136, a UI controller 104, a correlator 148, an allocator 138, a correlation table 150, and a controlled memory data structure 146. The user interface 102 displays a content source 110 comprising a UI object 112 and a UI object 114. The UI controller 104 generates a navigation options menu 106 as an overlay above the content source 110, in response to input controls to either the UI object 112 or the UI object 114. The UI controller 104 generates an input menu 118 as an overlay above the content source 110 in response to an annotation control and/or a second link control detected through the navigation options menu 106. The input menu 118 comprises at least one input field 130 and a link classification 132. The at least one input field 130 receives at least one user content control (e.g., user generated content). The link classification 132 may be entered by the user, selected from a limited list of classification options, or generated automatically depending on the type of control associated with the display of the input menu 118.

UI objects (e.g., UI object 112 and UI object 114) may be stored in UI content storage 144 within the controlled memory data structure 146 through operation of the allocator 138. UI objects may be retrieved for display within the content map 108. The UI objects may be text, images, audio, audio range, and/or a region of the content source 110 as displayed within the user interface 102 at a specific instance or during a predetermined interval. Depending on the size of the UI object, the system may store the original UI object or a sample of the UI object within the UI content storage 144.

The UI objects are correlated within the annotation entry or contextual link description within a correlation table 150 through operation of a correlator 148.

A presentation modeler 140 generates a user content menu 116 and a content map 108 to be displayed as an overlay above the content source 110 within the user interface 102. The content map 108 may be displayed after receiving a content map control detected by the UI controller 104. The UI controller 104 configures a selector 136 with the content map control that includes the association with the UI object. The selector 136 utilizes the content map control to identify all correlations associated with the UI object and retrieves the annotation entries, the contextual link descriptions, and the associated UI objects from the link description storage 142 and the UI content storage 144, respectively. The selector 136 then routes the retrieved content to the presentation modeler 140 to generate the content map. The content map 108 may display a contextual link 160 comprising a first UI object 126 and a second UI object 124 with user content 134 describing the association between the two UI objects. The annotation 162 may display a UI object 128 or representation of the UI object and user content 164 and a link classification 166.

The user content menu 116 may be displayed after receiving a user content menu control detected by the UI controller 104. The UI controller 104 configures the selector 136 with the user content menu control to identify all annotation entries associated with the UI object within the correlation table 150. The selector 136 then retrieves the annotation entries from the link description storage 142 to be utilized by the presentation modeler 140. The user content menu 116 displays user content 158 and a link classification 156 associated with annotation entries. In some configurations, the annotation entries may be classified as questions associated with the UI object. In this configuration the user content menu 116 may provide a listing of different annotation entries classified as questions or responses to questions. The presentation modeler 140 would arrange the annotation entries displayed in the user content menu 116 in accordance with a presentation order, determined by a sequencer 152. The sequencer 152 may utilize the link classifications and historic user interactions with the annotation entries stored in a historic interaction storage 154 to determine which annotation entries and in which order the annotation entries are to be displayed within the user content menu 116. By limiting the presentation of the annotation entries depending on their link classifications and historic interactions, the system is able to improve the performance of the system by reducing the load on system resources to retrieve and display the annotation entries.

In some configurations, the correlation table 150 may be stored remotely compared to the user interface 102. The location of the correlation table 150 allows the system 100 to share annotations and contextual links across multiple devices.

Following the creation of annotations, annotation, entries, and contextual links, the presentation modeler 140 generates an adjacently positioned link counter 122 and a visible indicator 120 positioned around the UI object 112 and the UI object 114. The visible indicator 120 and the link counter 122 identify UI objects within the content source 110 that carry associations with either a piece of user generated content (e.g., annotation entry) or with another UI object within the same content source 110 or a different content source. The visible indicator 120 allows for facilitated identification of UI objects with associations while the link counter 122 provides a numerical indicator of the quantity of associations that the particular UI object has.

The system 100 may be operated in accordance with the processes described in FIG. 2-FIG. 6.

Figure 2:
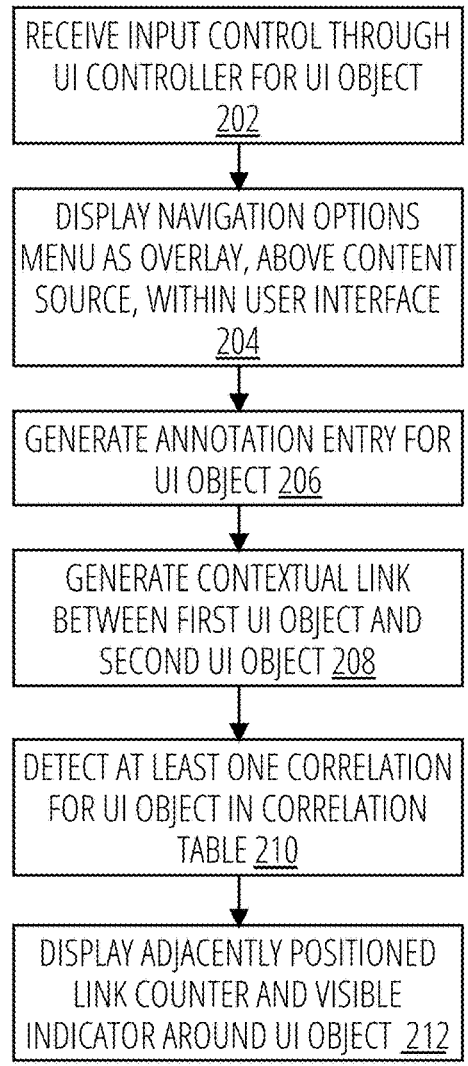
FIG. 2 illustrates a method 200 in accordance with one embodiment.
Figure 3:
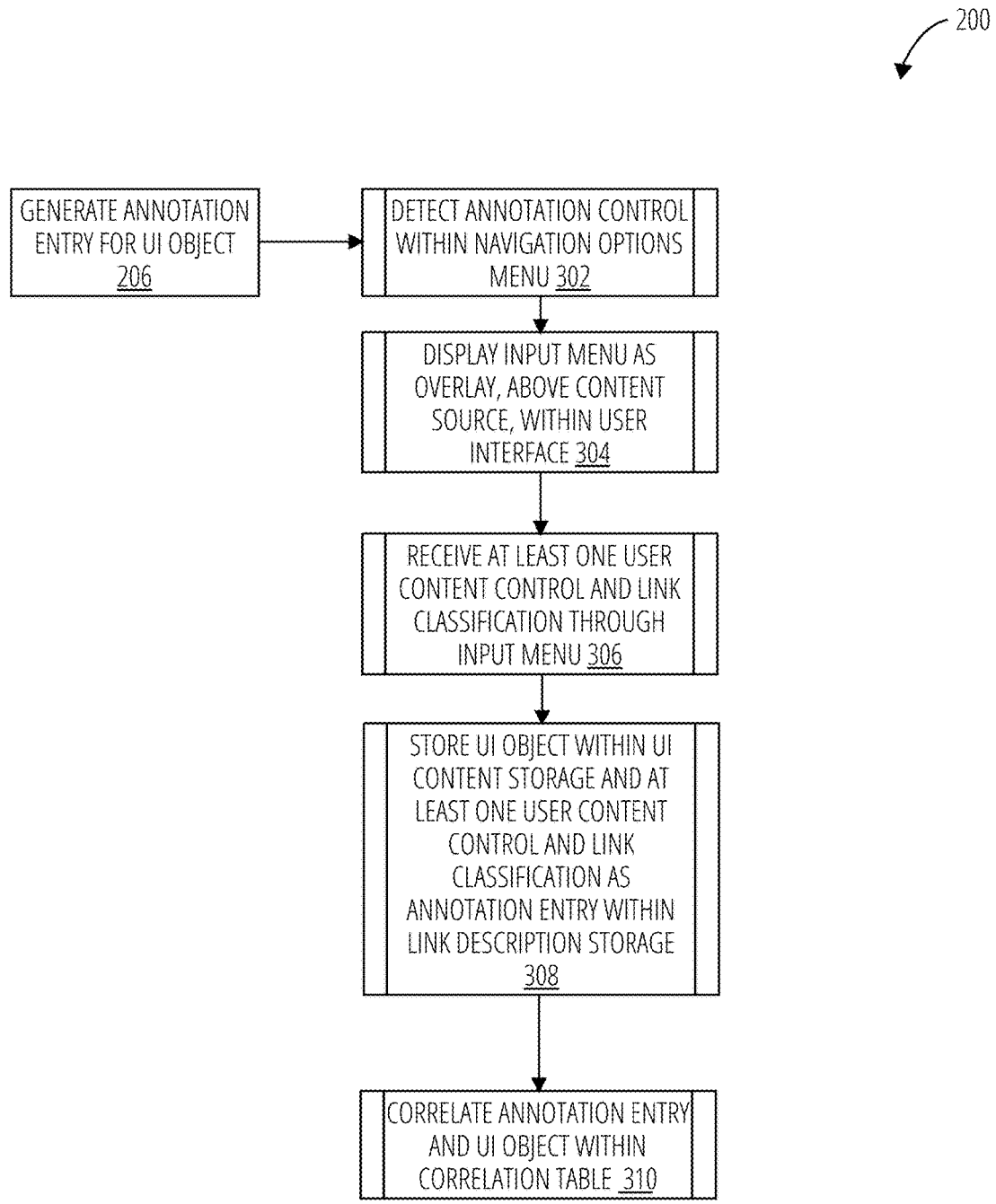
FIG. 3 illustrates a method 200 in accordance with one embodiment.
Figure 4:
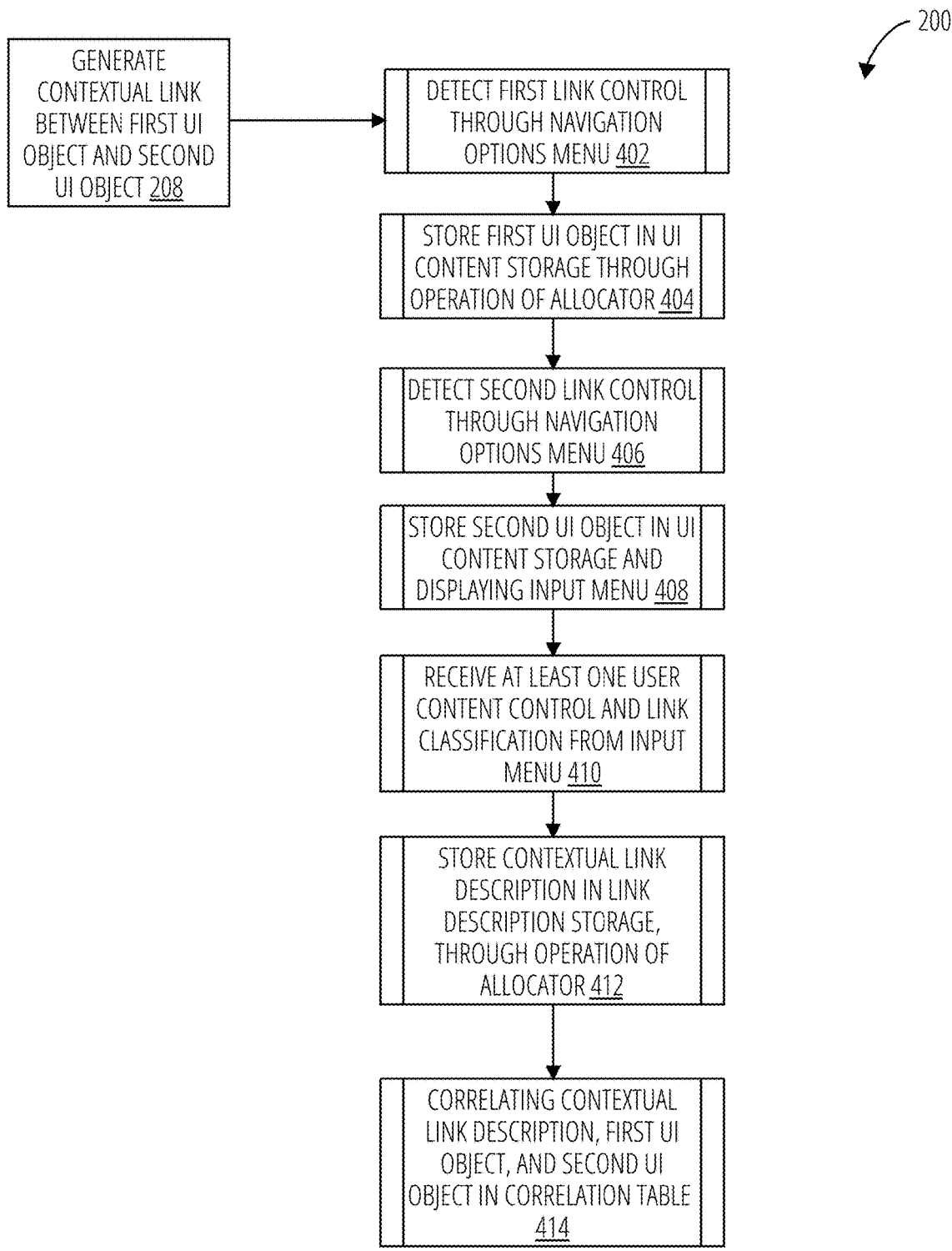
FIG. 4 illustrates a method 200 in accordance with one embodiment.

Referencing FIG. 2 through FIG. 4, a method 200 for operating a system for creating and retrieving contextual links between user interface (UI) objects involves receiving an input control through a UI controller for a UI object (block 202). In block 204, the method 200 displays a navigation options menu as an overlay, above a content source, within a user interface. In block 206, the method 200 generates an annotation entry for the UI object. In block 208, the method 200 generates a contextual link between a first UI object and a second UI object. In block 210, the method 200 detects at least one correlation for the UI object in the correlation table through operation of the selector. In block 212, the method 200 displays an adjacently positioned link counter and a visible indicator around the UI object through operation of a presentation modeler.

In block 206, generating the annotation entry for the UI object involves detecting an annotation control within the navigation options menu (subroutine block 302). In subroutine block 304, the method 200 displays an input menu as an overlay, above the content source, within the user interface. In subroutine block 306, the method 200 receives at least one user content control and a link classification through the input menu. In subroutine block 308, the method 200 stores the UI object within UI content storage and the at least one user content control and the link classification as the annotation entry within link description storage through operation of an allocator. In subroutine block 310, the method 200 correlates the annotation entry and the UI object within a correlation table through operation of a correlator.

In block 208, generating a contextual link between a first UI object and a second UI object involves detecting a first link control through the navigation options menu through operation of the UI controller (subroutine block 402). In subroutine block 404, the method 200 stores the first UI object in the UI content storage through operation of the allocator. In subroutine block 406, the method 200 detects a second link control through the navigation options menu through operation of the UI controller. In subroutine block 408, the method 200 stores the second UI object in the UI content storage, through operation of the allocator, and displays the input menu. In subroutine block 410, the method 200 receives the at least one user content control and the link classification from the input menu. In subroutine block 412, the method 200 stores a contextual link description in the link description storage, through operation of the allocator. In subroutine block 414, the method 200 correlates the contextual link description, the first UI object, and the second UI object in the correlation table through operation of the correlator.

Figure 5:
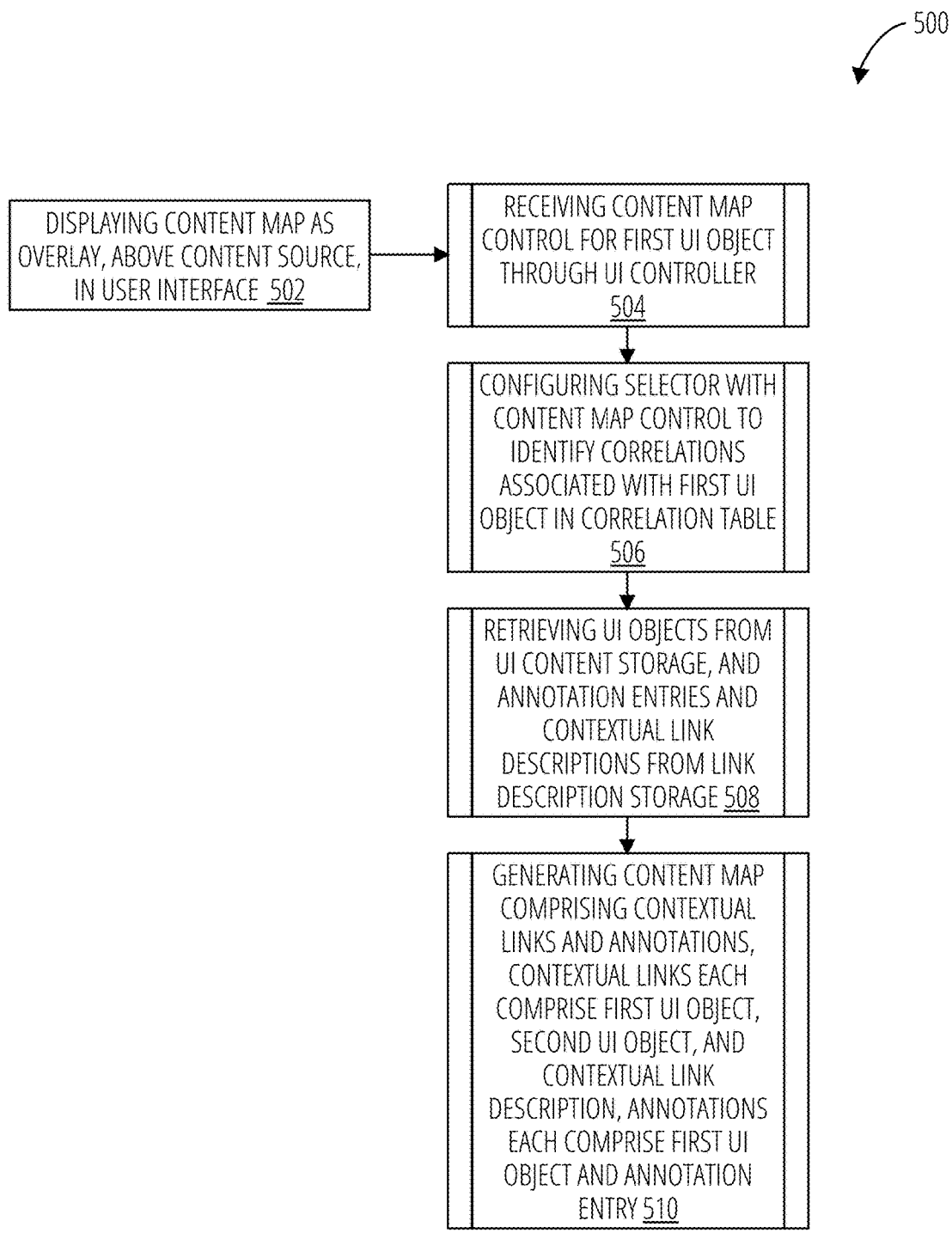
FIG. 5 illustrates a method 500 in accordance with one embodiment.

Referencing FIG. 5, the method 500 for operating a system for creating and retrieving contextual links between user interface objects involves displaying a content map as an overlay, above the content source, in the user interface (block 502). The process of displaying the content map involves receiving a content map control for the first UI object through the UI controller (subroutine block 504). In subroutine block 506, the method 500, configures a selector with the content map control to identify correlations associated with the first UI object in the correlation table. In subroutine block 508, the method 500 retrieves UI objects from the UI content storage, and annotation entries and contextual link descriptions from the link description storage. In subroutine block 510, the method 500 generates the content map comprising the contextual links and annotations. The contextual links each comprise the first UI object, the second UI object, and the contextual link description. The annotations each comprise the first UI object and the annotation entry.

Figure 6:
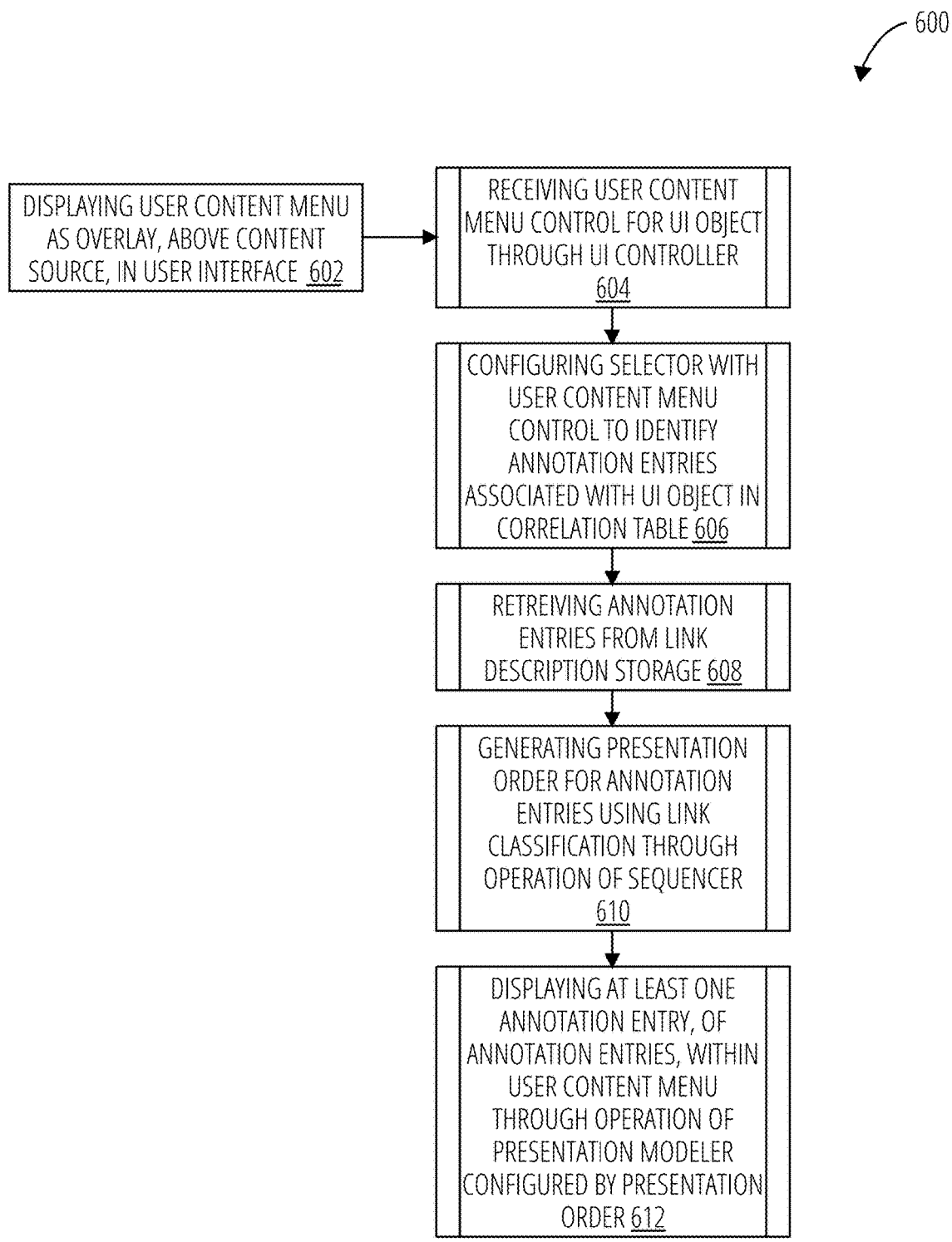
FIG. 6 illustrates a method 600 in accordance with one embodiment.
Figure 7:
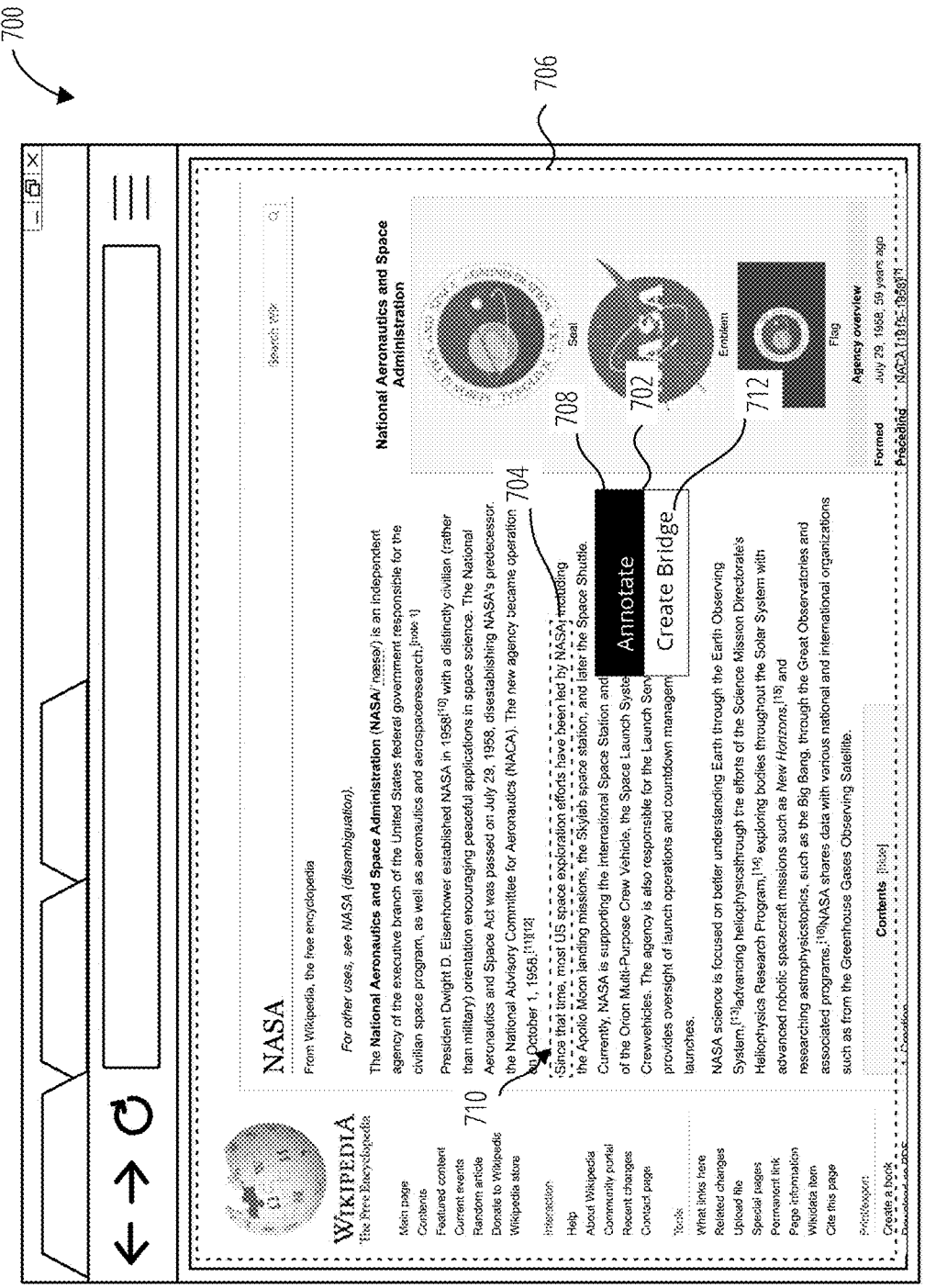
FIG. 7 illustrates a user interface 700 in accordance with one embodiment.

Referencing FIG. 6, the method 600 for operating a system for creating and retrieving contextual links between user interface objects involves displaying a user content menu as an overlay, above the content source, in the user interface (block 602). In subroutine block 604, the process of displaying the user content menu involves receiving a user content menu control for the UI object through the UI controller. In subroutine block 606, the method 600 configures a selector with the user content menu control to identify annotation entries associated with the UI object in the correlation table. In subroutine block 608, the method 600 retrieves the annotation entries from the link description storage. In subroutine block 610, the method 600 generates a presentation order for the annotation entries using the link classification through operation of a sequencer. In subroutine block 612, the method 600 displays at least one of the annotation entries within the user content menu through operation of the presentation modeler configured by the presentation order.

Referencing FIG. 7 through FIG. 9 and FIG. 13 through FIG. 18, a user interface 700 displays a first content source 706 within a browser. A first UI object 704 is identified within the first content source 706 (NASA Wikipedia page) by a UI object highlight 710 as a string of text. A user wishing to generate an annotation entry for the particular string of text (first UI object 704) would enter an input control to generate the navigation options panel 702. From there the user is provided with the options to generate an annotation (annotate option 708) or a create a bridge option 712. Selecting the annotate option 708 would generate an annotation control, while selecting the create a bridge option 712 would generate a first link control. The navigation options panel 702 illustrates selection of the annotate option 708 generating an annotation control.

Figure 8:
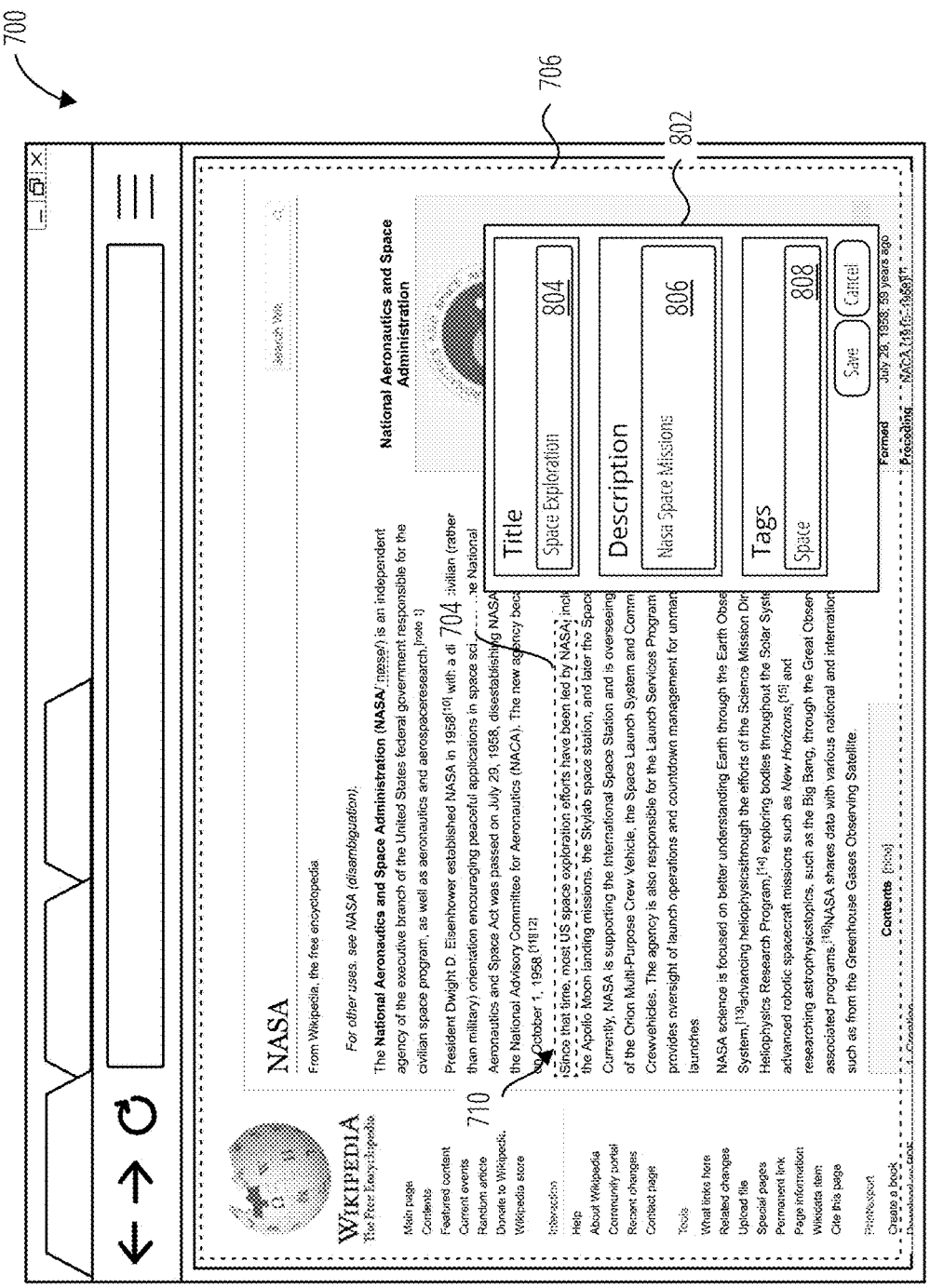
FIG. 8 illustrates a user interface 700 in accordance with one embodiment.

In FIG. 8, the user interface 700 shows that an input menu 802 has been generated following annotation control. The input menu 802 comprises a title field 804, a description field 806, and a tag field 808. The title field 804, the description field 806, and the tag field 808 serve as the input fields for accepting the user content. The title field 804 includes the title "Space Exploration" entered in by the user. The description field 806 includes a brief description of "NASA space mission". The tag field 808 includes a tag "Space" stating a general category to which the annotation belongs. When the user completes filling out the input menu 802, they have the option to save or cancel the annotation that they created.

Figure 9:
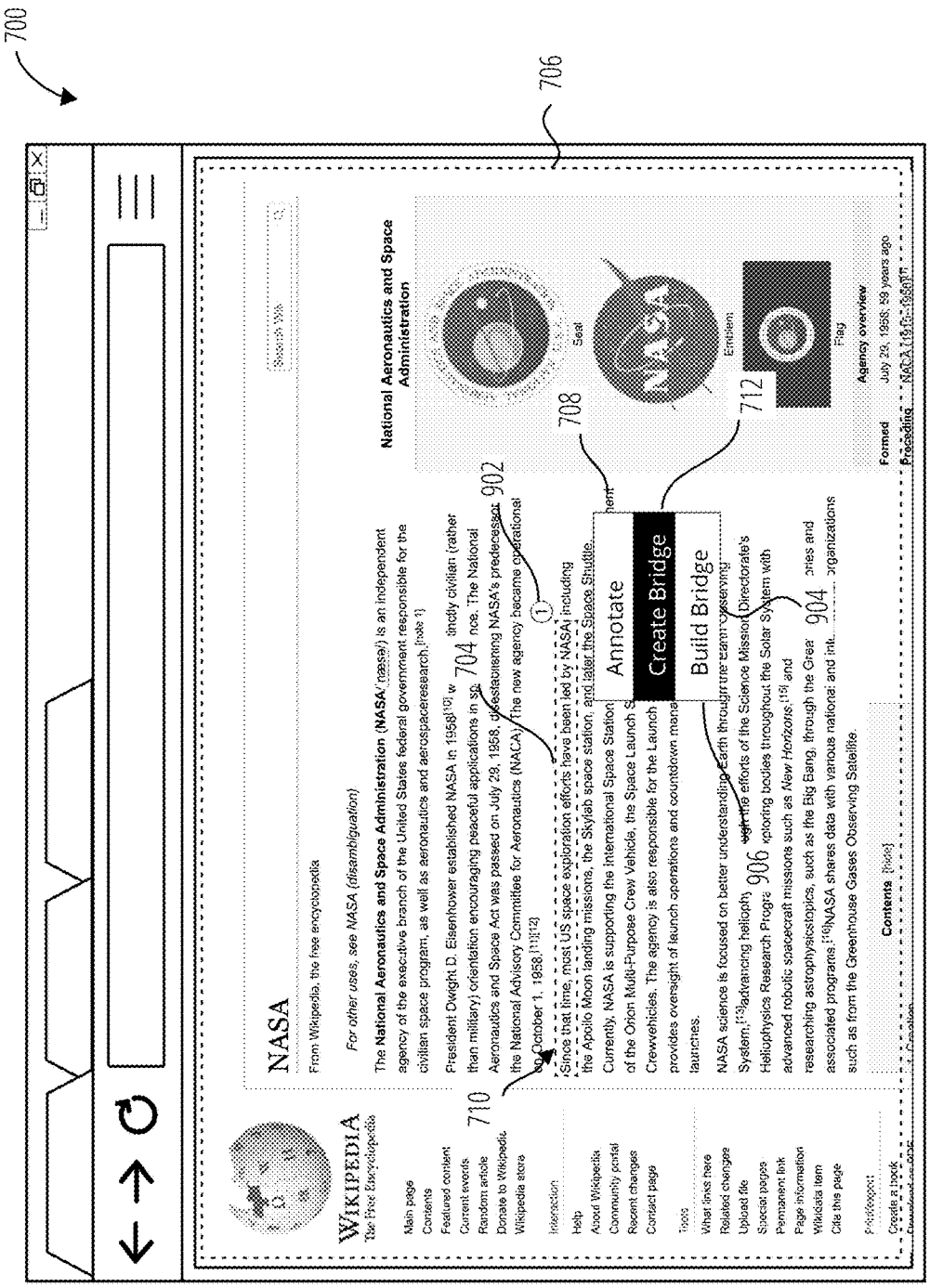
FIG. 9 illustrates a user interface 700 in accordance with one embodiment.

In FIG. 9, the user interface 700 is shown following the creation of annotation entry for the first UI object 704. The UI object highlight 710 is shown surrounding the first UI object 704 and a link counter 902 is displayed adjacent to the UI object highlight 710 showing that the first UI object 704 has one associated link. The user may want to associate the first UI object 704 with a second UI object. The user may do this step before or after the creation of an annotation by displaying the navigation options menu 904 and selecting a create a bridge option 712. Selection of the create a bridge option 712 generates a first link control. The navigation options menu 904 also includes a build bridge option 906 when a second UI object is identified. Selection of the build bridge option 906 generates a second link control.

Figure 10:
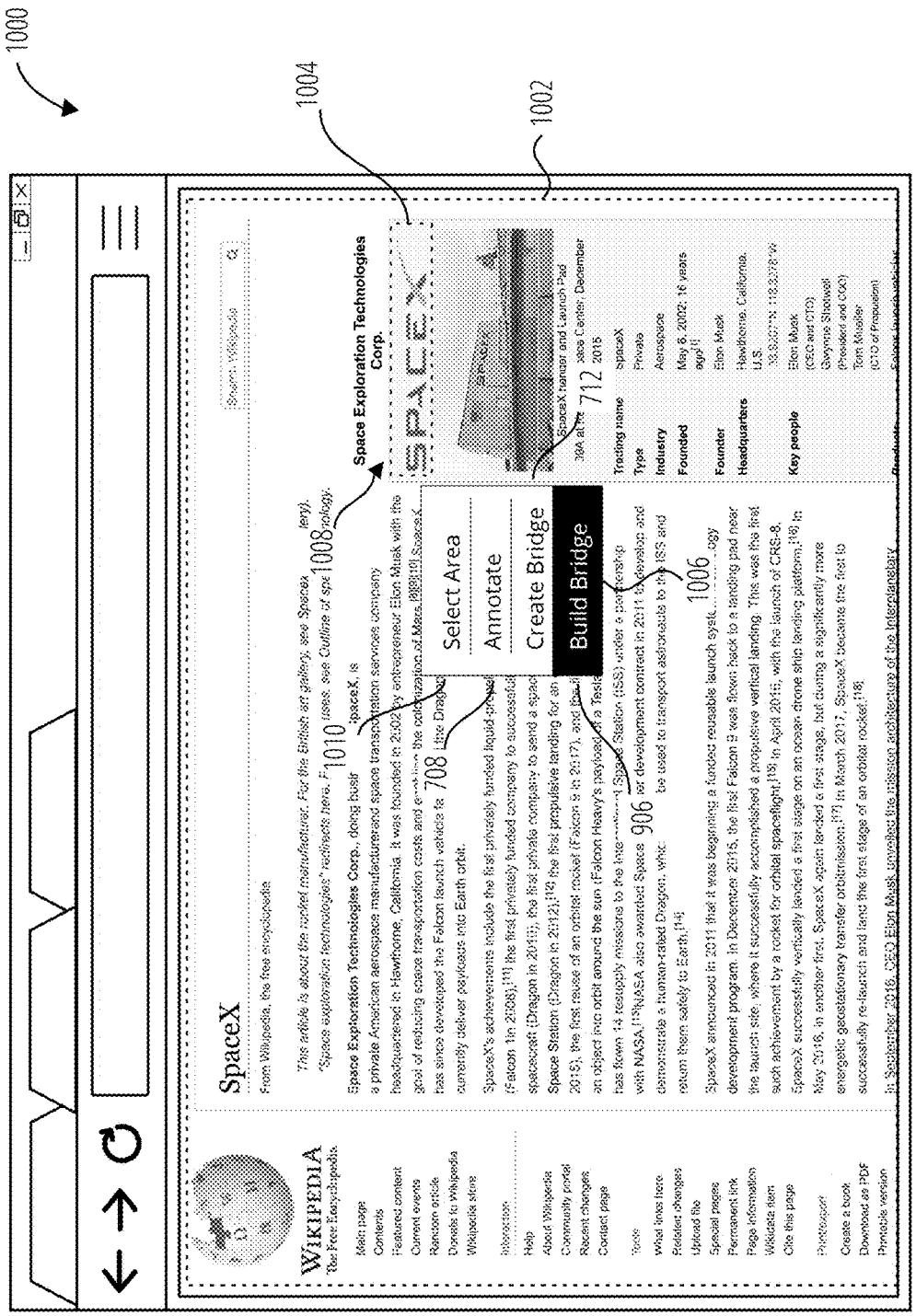
FIG. 10 illustrates a user interface 1000 in accordance with one embodiment.

In FIG. 10, a user interface 1000 displays a second content source 1002 within a browser. The user interface 1000 and the user interface 700 show different tabs of the same browser. The second content source 1002 shows the Wikipedia article for SPACEX™. The navigation options menu 1006 is displayed above the second content source 1002 showing the annotate option 708, the create a bridge option 712, and the build bridge option 906, as well as a select area option 1010 for selecting UI objects. An image of the SpaceX logo is shown surrounded by a UI object highlight 1008 identifying the logo as the second UI object 1004. With the first link control previously selected for the first UI object, the build bridge option 906 may be selected to generate a second link control and contextual link between the two UI objects.

Figure 11:
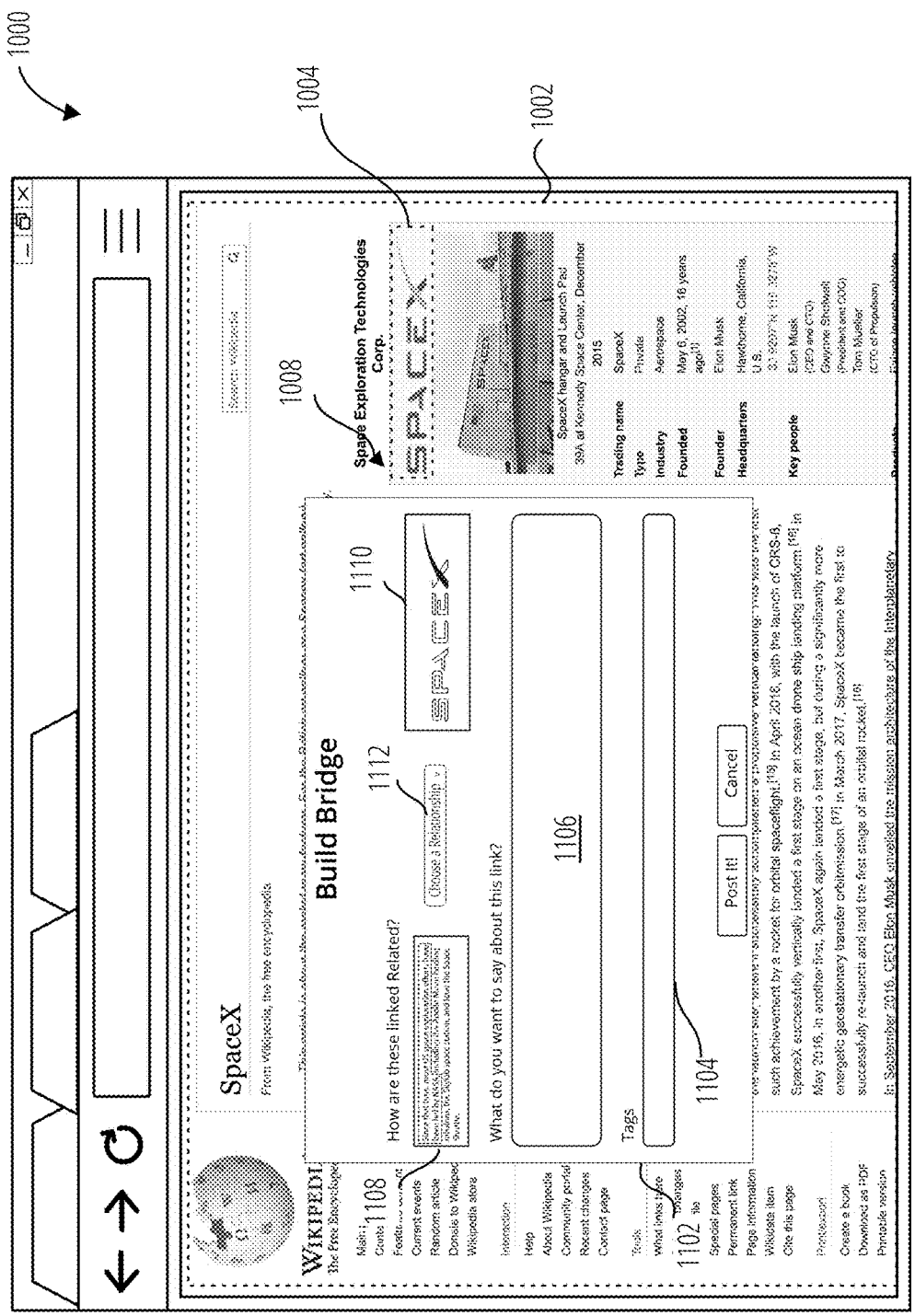
FIG. 11 illustrates a user interface 1000 in accordance with one embodiment.

In FIG. 11, an input menu 1102 is generated to enter user content describing the link between the two UI objects. The input menu 1102 comprises representations of the first UI object 1108 and the second UI object 1110, a relationship type selector 1112 identifying a particular link category for the contextual link. A description field 1106 is also provided, allowing a user to enter information regarding the contextual link, and a tag field 1104 is provided, to assist in the categorization of the contextual link based on its content. When the user has completed filling out the input menu 1102, they have the option to post the contextual link or cancel the work that they have done.

Figure 12:
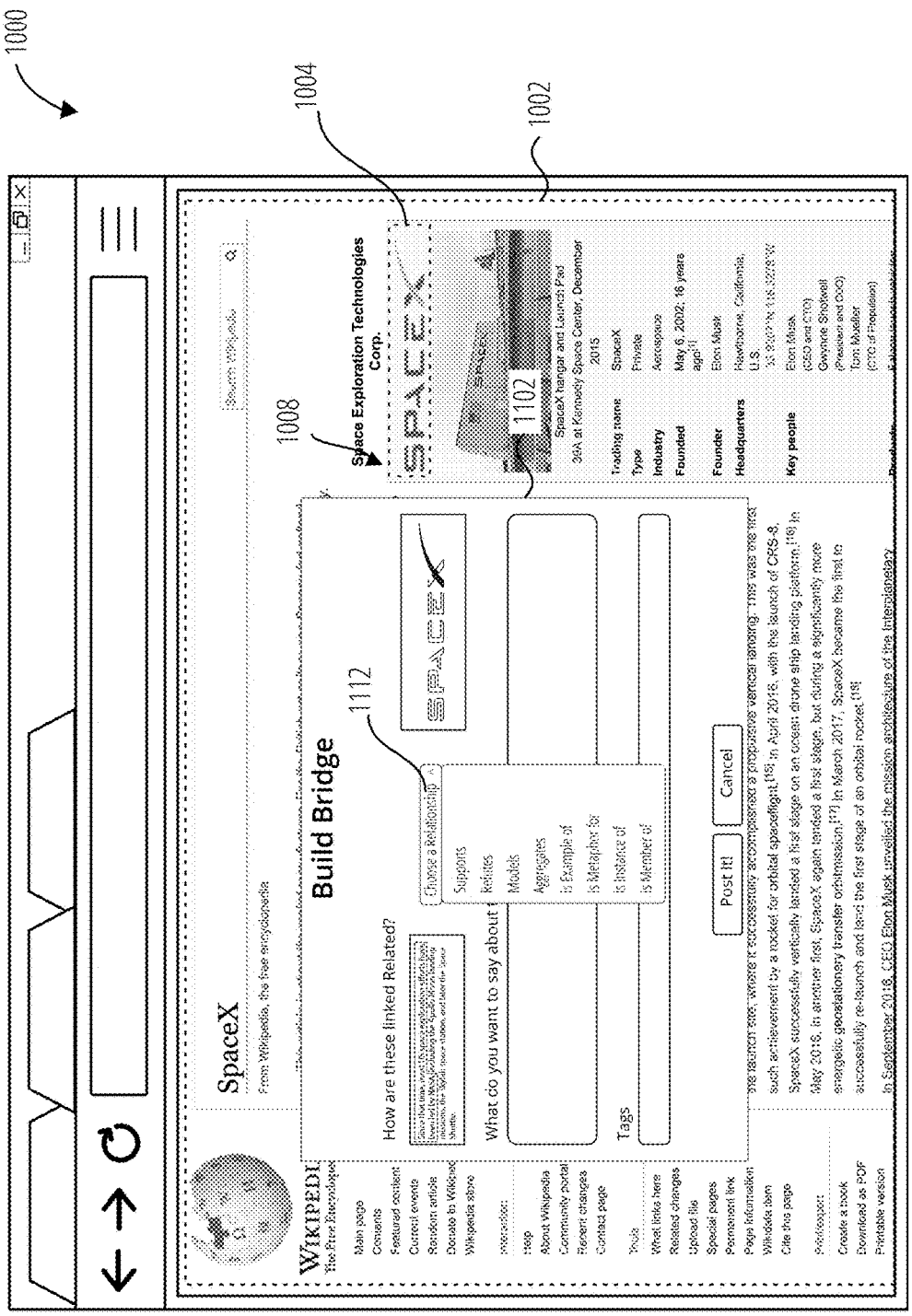
FIG. 12 illustrates a user interface 1000 in accordance with one embodiment.

In FIG. 12, the relationship type selector 1112 is shown expanded displaying a limited list of relationships categorizing the relationship between the first UI object and the second UI object.

Figure 13:
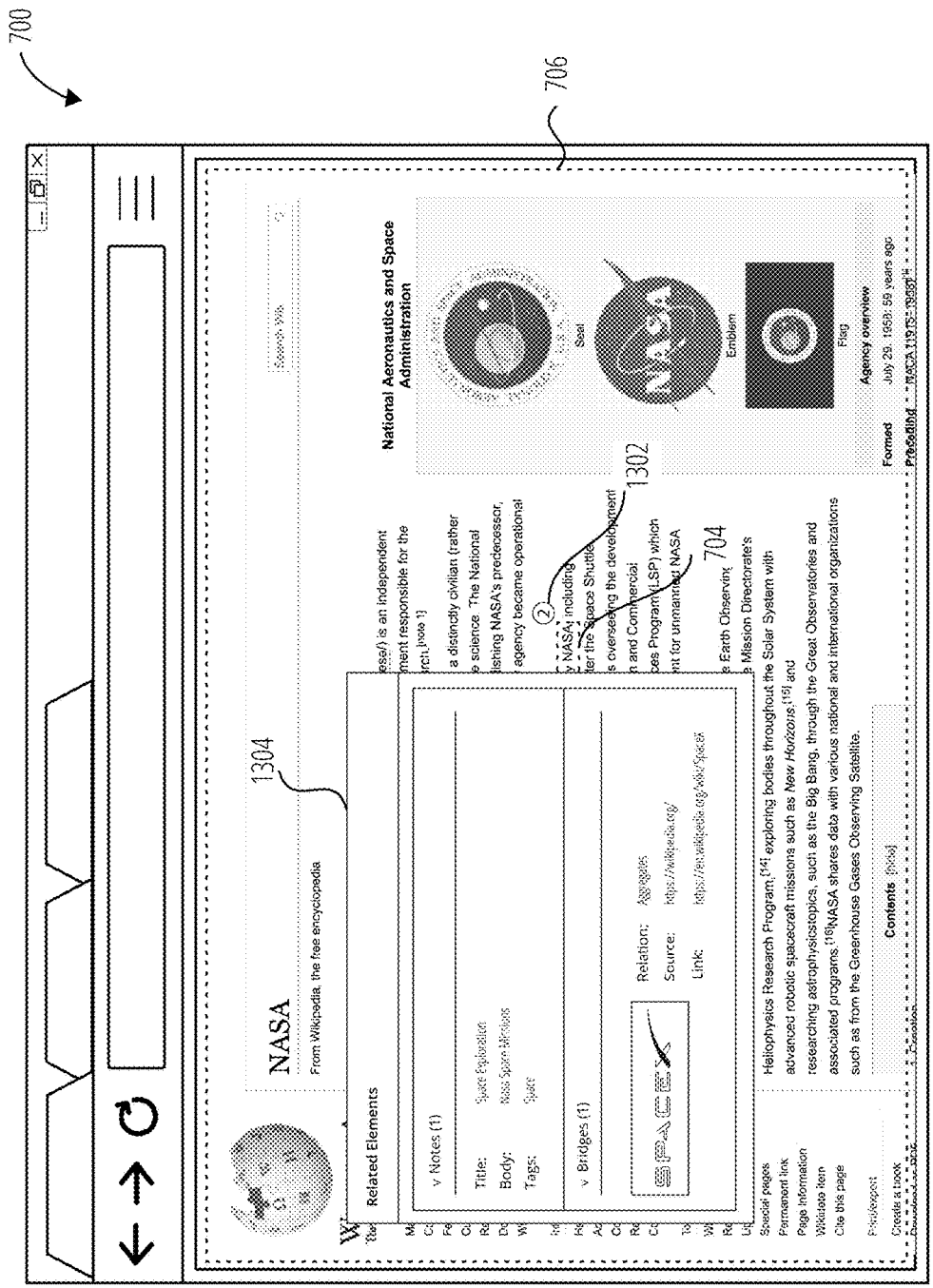
FIG. 13 illustrates a user interface 700 in accordance with one embodiment.

In FIG. 13, the first content source 706 is shown again within the user interface 700 following the creation of the contextual link. The link counter 1302 surrounding the first UI object 704 now shows the number "two," indicating that, in addition to the previous annotation entry, the contextual link is also being counted as a known association. A user may want to view the contextual links and annotation entries associated with the first UI object 704. The user may enter a content map control generating the content map 1304. The content map 1304 displays the annotation showing the user content submitted through the input menu (e.g., title, body, and tags). The content map 1304 also displays the contextual links associated with the first UI object 704, showing a representation of the second UI object and user content related with the contextual link, such as the relationship. The contextual link may also include the source location and a link address for accessing the second UI object.

Figure 14:
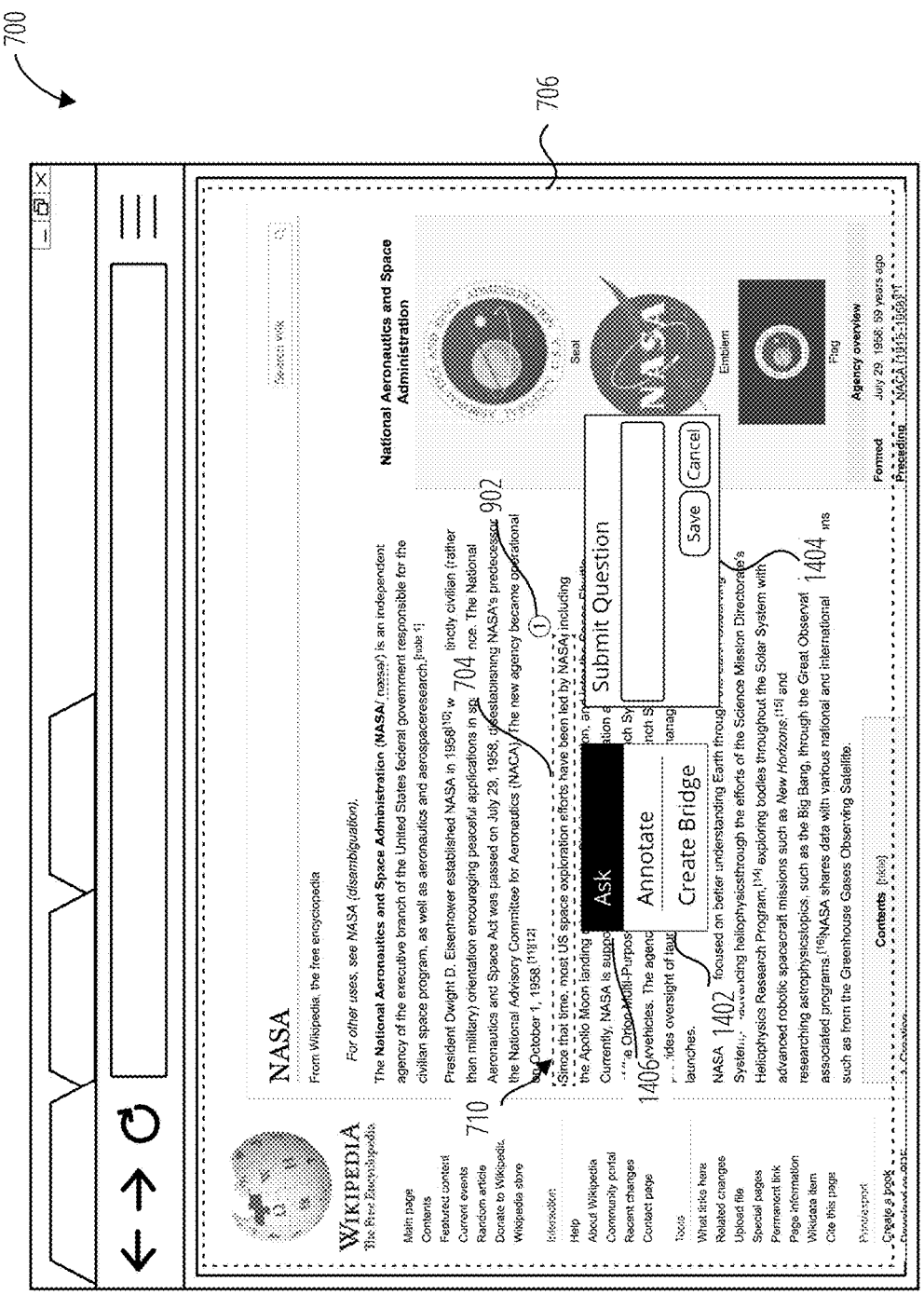
FIG. 14 illustrates a user interface 700 in accordance with one embodiment.

FIG. 14, the user interface 700 includes a navigation options menu 1402 with an ask question option 1406. Selecting the ask question option 1406 generates an input menu 1404 where a user may submit a question associated with the first UI object 704 through an input menu 1404.

Figure 15:
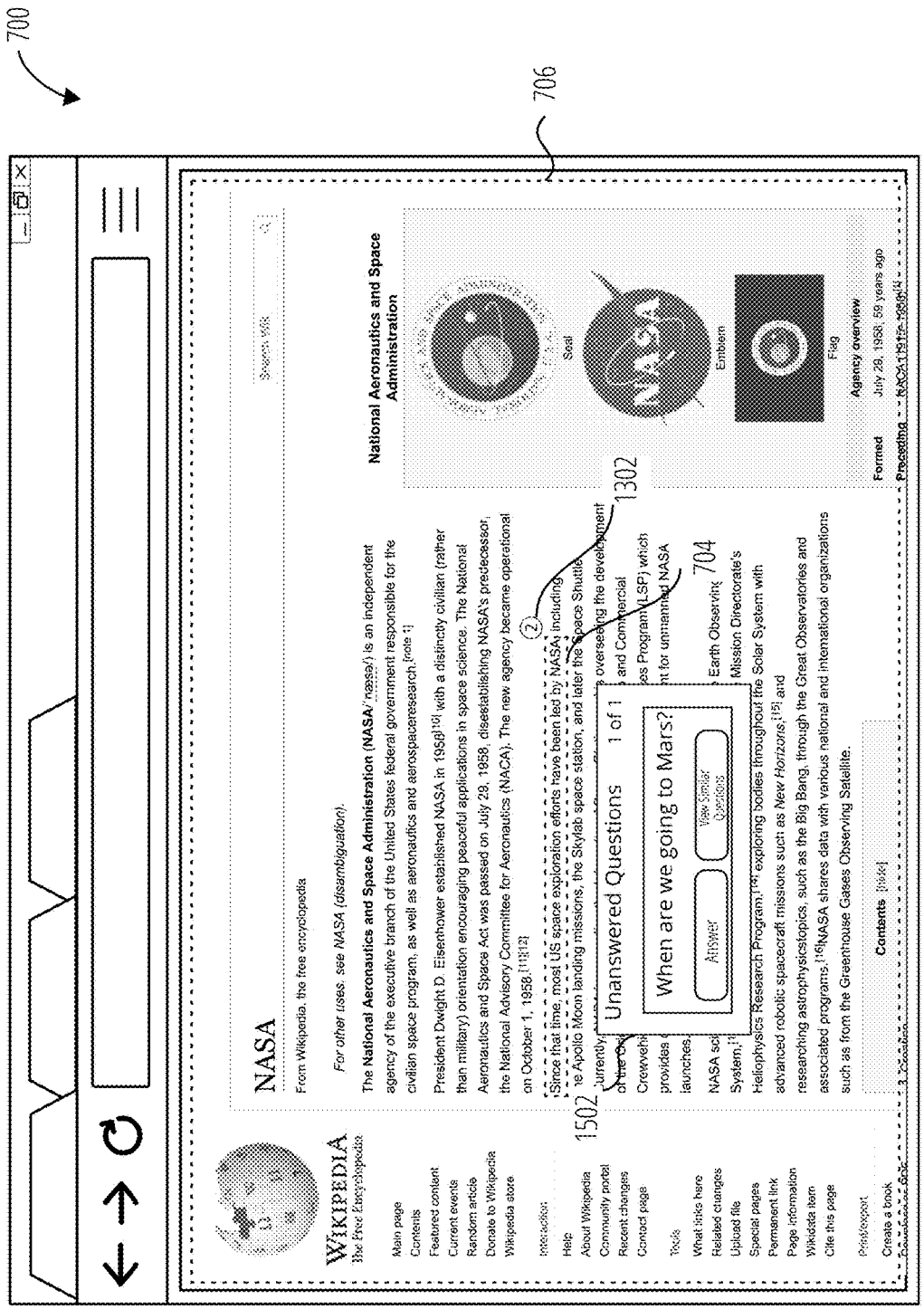
FIG. 15 illustrates a user interface 700 in accordance with one embodiment.

In FIG. 15, the user interface 700 shows a user content menu 1502 generated following the detecting of a user content control. In this instance, the user content control shows that there is one unanswered question associated with the first UI object 704. The user is given options to answer the question or view similar questions to the currently asked question. If the user selects view similar questions, the user may be able to view similar unanswered questions or similar questions that have been previously answered by the other users.

Figure 16:
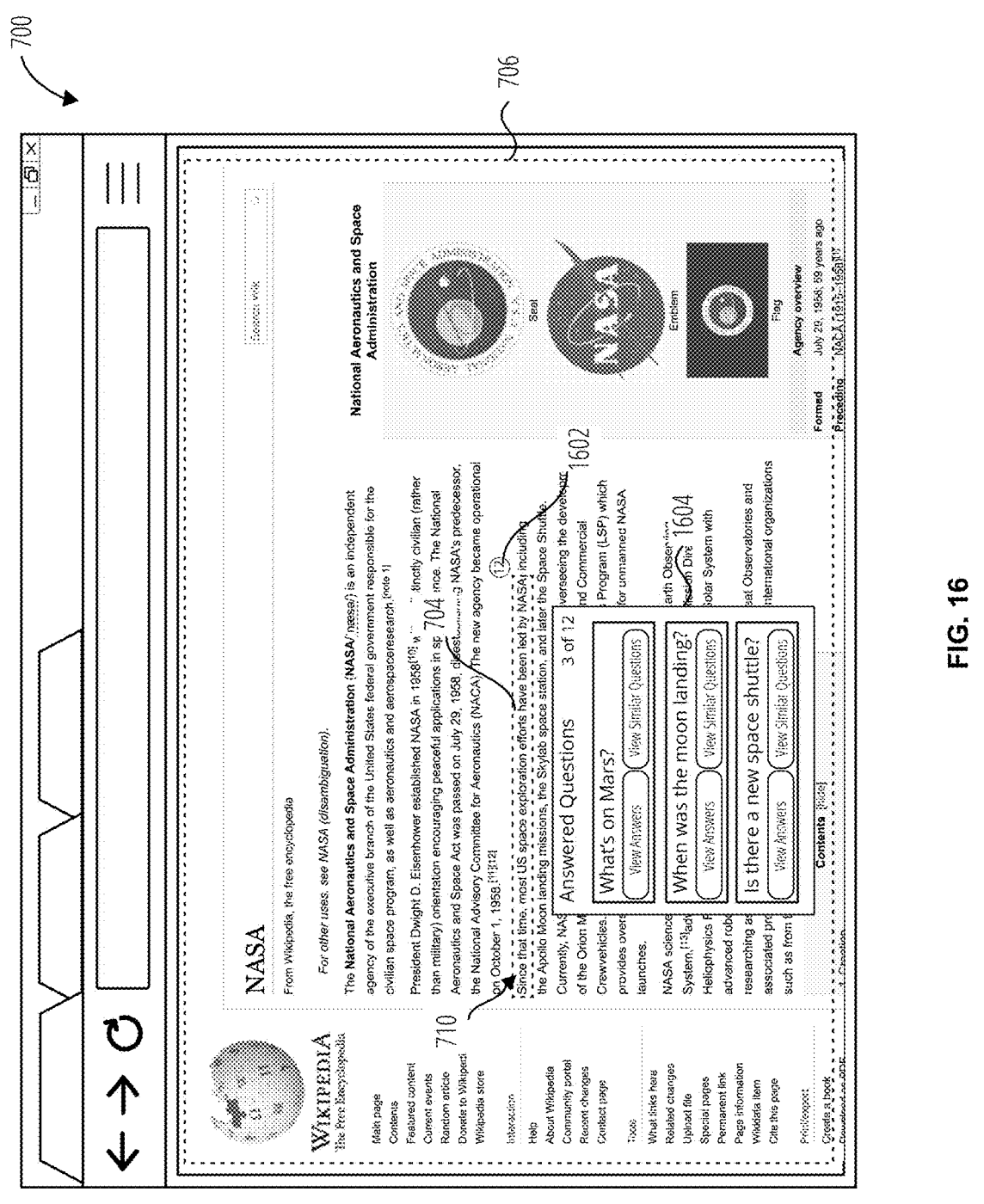

In FIG. 16, the user interface 700 shows a link counter 1602 with "twelve" associations for the first UI object 704. In this instance, a user content menu 1604 is displayed showing 3 of 12 answered questions associated with the first UI object 704. Each question includes an option to view the answer to the current question or view similar questions. The order in which the answered questions are presented may be determined by the presentation order generated by the sequencer that identifies/differentiates questions from answers and determines which questions have been viewed most by users in order to display the most relevant questions.

Figure 17:
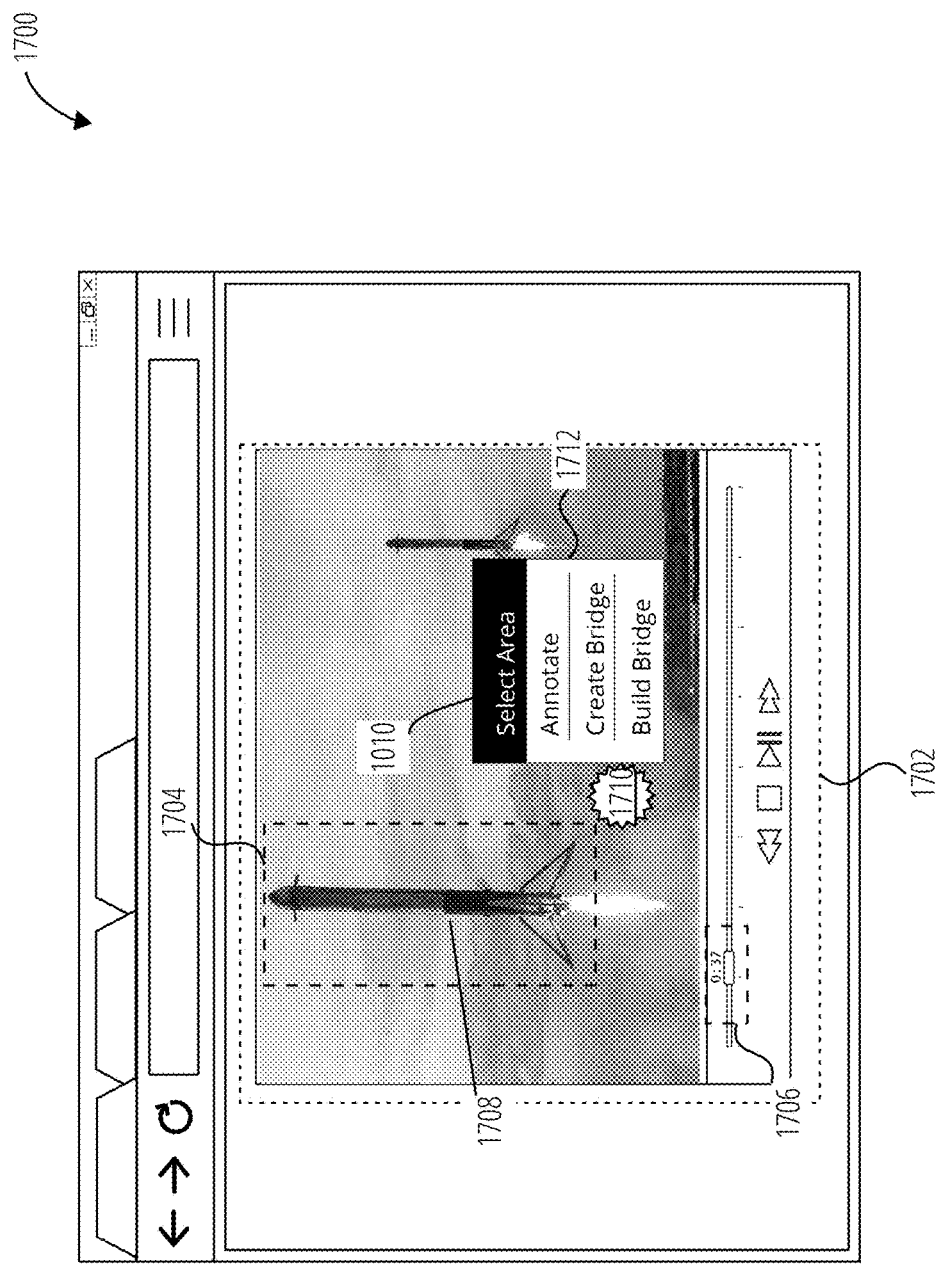
FIG. 17 illustrates a user interface 1700 in accordance with one embodiment.

Referencing FIG. 17, a user interface 1700 is shown as a browser presenting a video that serves as the content source 1702. During the video presentation, a user may identify something within the video that they wish to create a link to, submit a question, and/or view related content for it. The user may identify an area of the video with a highlight as a region of interest 1704 and the instances that the region of interest appears in as a content instance 1706. The region of interest 1704 may be generated by the user following the selection of the select area option 1010, which may provide the user with a selection box or the ability to create a box around a certain region within the content source 1702. With the region of interest 1704 and the content instance 1706 identified, the user is able to identify a first UI object 1708 (Falcon™ heavy side booster) to generate a content link. In some configurations, when a user highlights the region of interest 1704, the content source 1702 may be identified as a video and the region of interest 1704 may be associated with the particular instance within the video that the user identified as the region of interest 1704. Alternatively, the user may select a region within the video and separately identify a content instance 1706 to associate it as the first UI object 1708.

Figure 18:
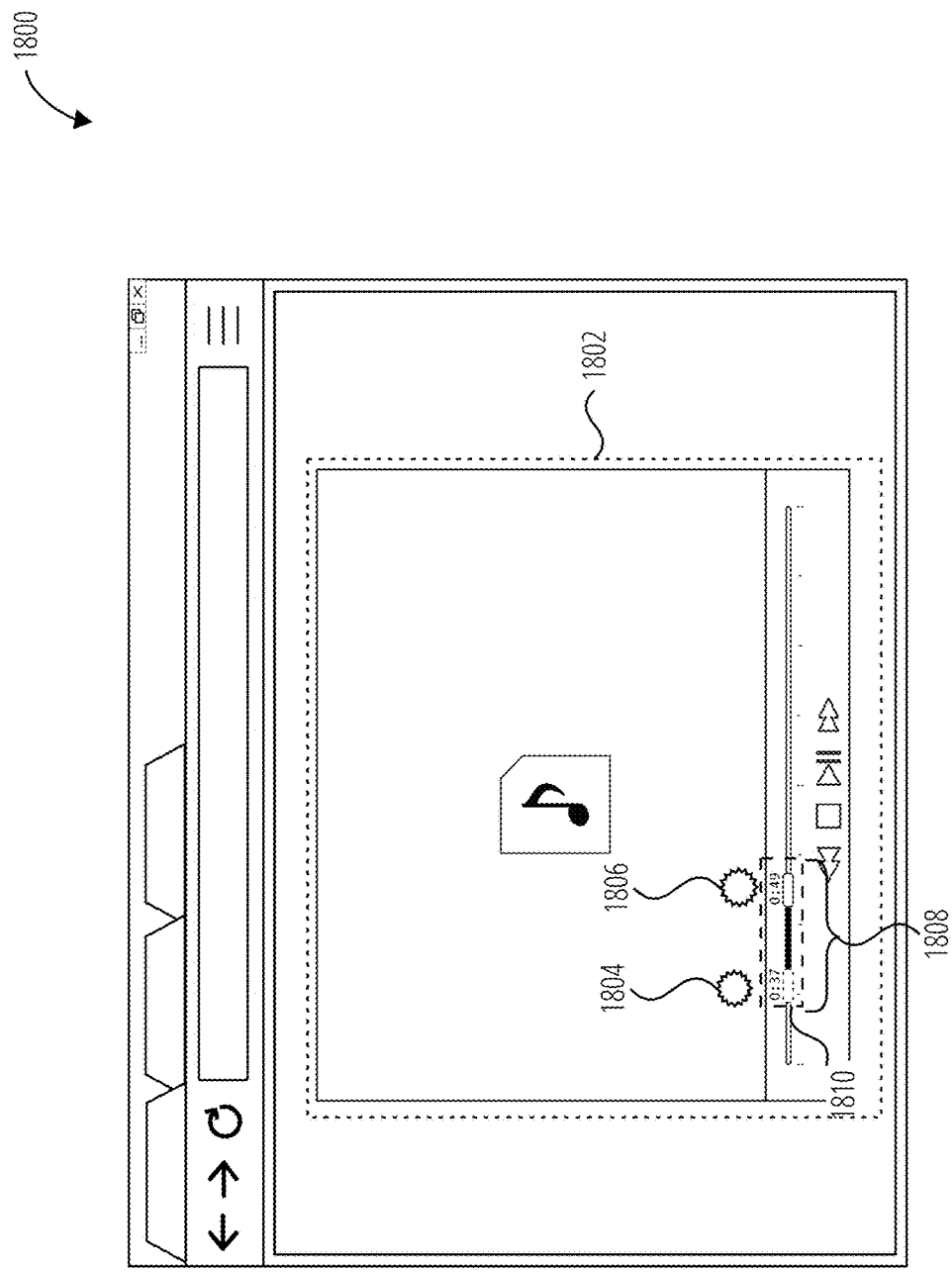
FIG. 18 illustrates a user interface 1800 in accordance with one embodiment.

Referencing FIG. 18, a user interface 1800 is shown with a media player playing back some audio content (content source 1802) that a user wishes to create a content link to. Specifically, the user may wish to create a content link to a particular instance or interval during the playback. In this example, the content source 1802 is the audio content and the UI object 1808 is the instance or interval within the audio playback. To identify the range or instance (content instance/range 1810), the UI controller may identify a first input control 1804 identifying the start of the interval and a second input control 1806 identifying the end of the interval. The first input control 1804 and the second input control 1806 may be separate inputs (e.g., individual mouse clicks, key presses, etc.) or a toggle (e.g., mouse button hold start and stop). After the UI object 1808 has been identified, the user may select to create a link to the audio or video media content and provide a user generated transcript as the piece of content that they are linking.

Figure 19:
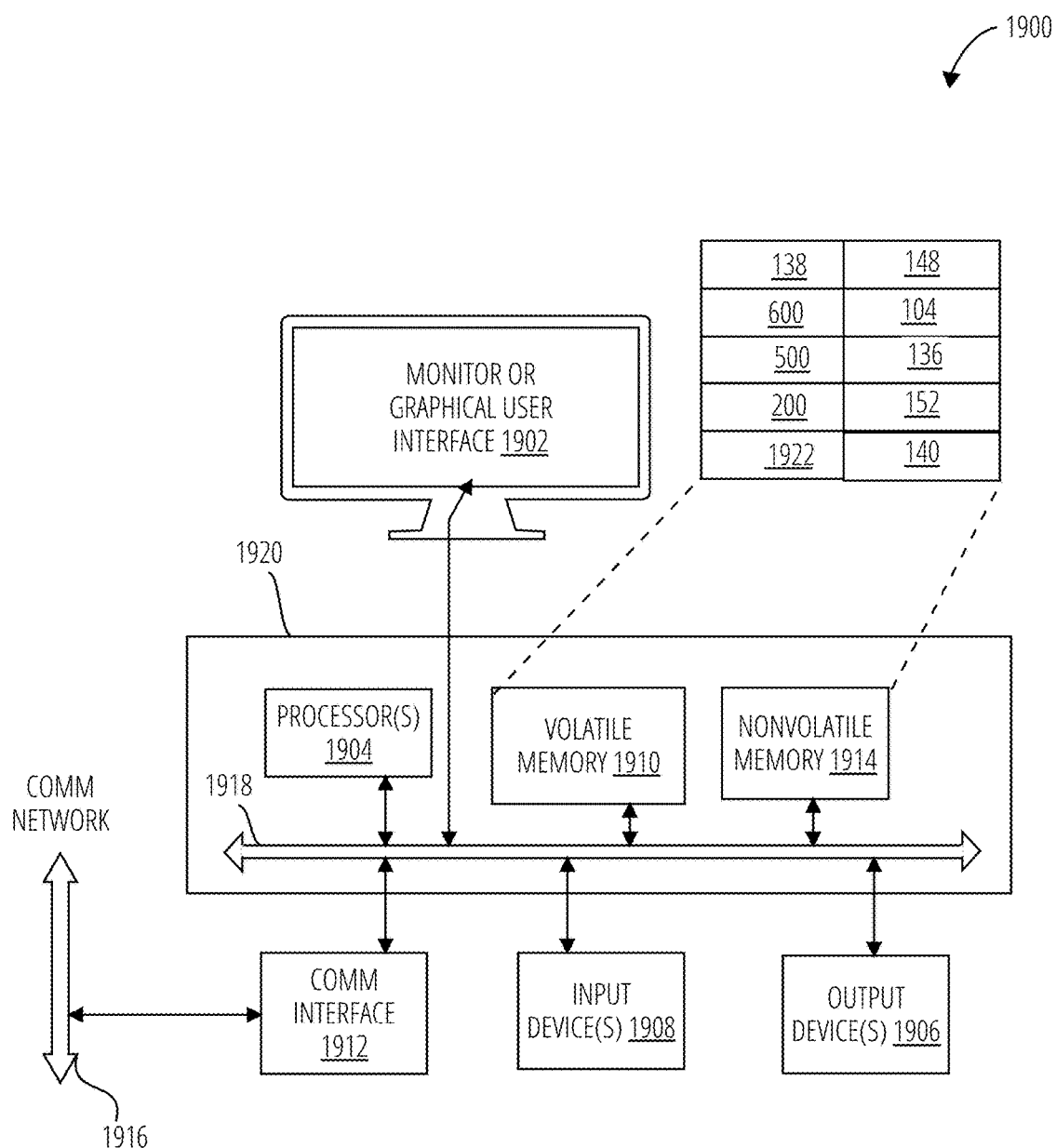
FIG. 19 illustrates a computing device 1900 in accordance with one embodiment.

FIG. 19 is an example block diagram of a computing device 1900 that may incorporate embodiments of the present invention. FIG. 19 is merely illustrative of a machine system to carry out aspects of the technical processes described herein, and does not limit the scope of the claims. One of ordinary skill in the art would recognize other variations, modifications, and alternatives. In one embodiment, the computing device 1900 typically includes a monitor or graphical user interface 1904, a data processing system 1920, a communication network interface 1912, input device(s) 1908, output device(s) 1906, and the like.

As depicted in FIG. 19, the data processing system 1920 may include one or more processor(s) 1902 that communicate with a number of peripheral devices via a bus subsystem 1918. These peripheral devices may include input device(s) 1908, output device(s) 1906, communication network interface 1912, and a storage subsystem, such as a volatile memory 1910 and a nonvolatile memory 1914.

The volatile memory 1910 and/or the nonvolatile memory 1914 may store computer-executable instructions and thus forming logic 1922 that when applied to and executed by the processor(s) 1902 implement embodiments of the processes disclosed herein.

The input device(s) 1908 include devices and mechanisms for inputting information to the data processing system 1920. These may include a keyboard, a keypad, a touch screen incorporated into the monitor or graphical user interface 1904, audio input devices such as voice recognition systems, microphones, and other types of input devices. In various embodiments, the input device(s) 1908 may be embodied as a computer mouse, a trackball, a track pad, a joystick, wireless remote, drawing tablet, voice command system, eye tracking system, and the like. The input device(s) 1908 typically allow a user to select objects, icons, control areas, text and the like that appear on the monitor or graphical user interface 1904 via a command such as a click of a button or the like.

The output device(s) 1906 include devices and mechanisms for outputting information from the data processing system 1920. These may include the monitor or graphical user interface 1904, speakers, printers, infrared LEDs, and so on as well understood in the art.

The communication network interface 1912 provides an interface to communication networks (e.g., communication network 1916) and devices external to the data processing system 1920. The communication network interface 1912 may serve as an interface for receiving data from and transmitting data to other systems. Embodiments of the communication network interface 1912 may include an Ethernet interface, a modem (telephone, satellite, cable, ISDN), (asynchronous) digital subscriber line (DSL), FireWire, USB, a wireless communication interface such as Bluetooth or WiFi, a near field communication wireless interface, a cellular interface, and the like.

The communication network interface 1912 may be coupled to the communication network 1916 via an antenna, a cable, or the like. In some embodiments, the communication network interface 1912 may be physically integrated on a circuit board of the data processing system 1920, or in some cases may be implemented in software or firmware, such as "soft modems", or the like.

The computing device 1900 may include logic that enables communications over a network using protocols such as HTTP, TCP/IP, RTP/RTSP, IPX, UDP and the like.

The volatile memory 1910 and the nonvolatile memory 1914 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 1910 and the nonvolatile memory 1914 may be configured to store the basic programming and data constructs that provide the functionality of the disclosed processes and other embodiments thereof that fall within the scope of the present invention.

Logic 1922 that implements embodiments of the present invention may be stored in the volatile memory 1910 and/or the nonvolatile memory 1914. Said logic 1922 may be read from the volatile memory 1910 and/or nonvolatile memory 1914 and executed by the processor(s) 1902. The volatile memory 1910 and the nonvolatile memory 1914 may also provide a repository for storing data used by the logic 1922. The volatile memory 1910 and the nonvolatile memory 1914 may additionally store logic associated with the allocator 138, correlator 148, UI controller 104, selector 136, sequencer 152, and presentation modeler 140, as well as method 600, method 500, and method 200.

The volatile memory 1910 and the nonvolatile memory 1914 may include a number of memories including a main random access memory (RAM) for storage of instructions and data during program execution and a read only memory (ROM) in which read-only non-transitory instructions are stored. The volatile memory 1910 and the nonvolatile memory 1914 may include a file storage subsystem providing persistent (non-volatile) storage for program and data files. The volatile memory 1910 and the nonvolatile memory 1914 may include removable storage systems, such as removable flash memory.

The bus subsystem 1918 provides a mechanism for enabling the various components and subsystems of data processing system 1920 communicate with each other as intended. Although the communication network interface 1912 is depicted schematically as a single bus, some embodiments of the bus subsystem 1918 may utilize multiple distinct busses.

It will be readily apparent to one of ordinary skill in the art that the computing device 1900 may be a device such as a smartphone, a desktop computer, a laptop computer, a rack-mounted computer system, a computer server, or a tablet computer device. As commonly known in the art, the computing device 1900 may be implemented as a collection of multiple networked computing devices. Further, the computing device 1900 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Figure 20:
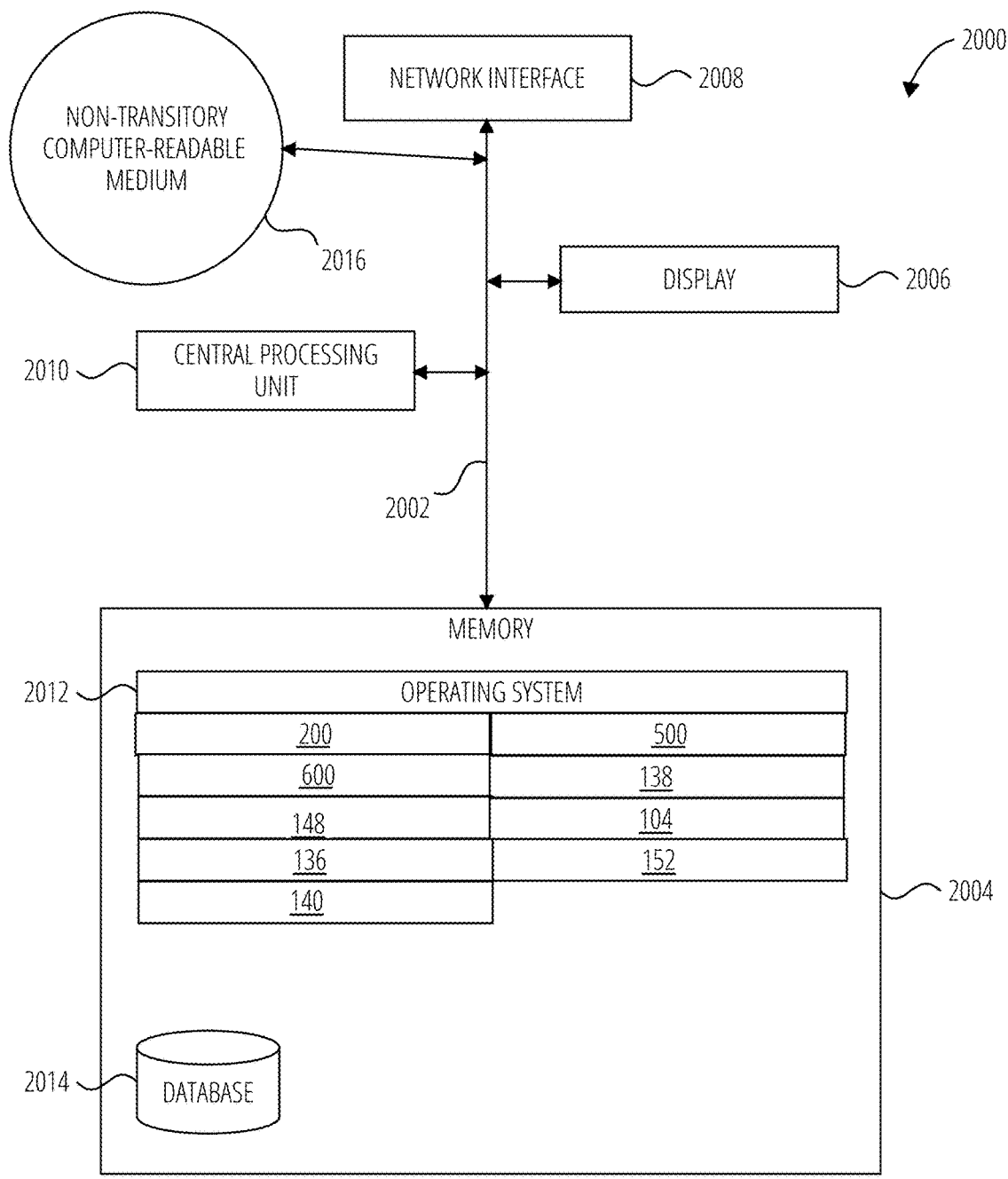
FIG. 20 illustrates a system 2000 in accordance with one embodiment.

FIG. 20 illustrates several components of an exemplary system 2000 in accordance with one embodiment. In various embodiments, system 2000 may include a desktop PC, server, workstation, mobile phone, laptop, tablet, set-top box, appliance, or other computing device that is capable of performing operations such as those described herein. In some embodiments, system 2000 may include many more components than those shown in FIG. 20. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 2000 may comprise one or more physical and/or logical devices that collectively provide the functionalities described herein. In some embodiments, system 2000 may comprise one or more replicated and/or distributed physical or logical devices.

In some embodiments, system 2000 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 2000 includes a bus 2002 interconnecting several components including a network interface 2008, a display 2006, a central processing unit 2010, and a memory 2004.

Memory 2004 generally comprises a random access memory ("RAM") and permanent non-transitory mass storage device, such as a hard disk drive or solid-state drive. Memory 2004 stores an operating system 2012, as well as logic associated with the allocator 138, correlator 148, UI controller 104, selector 136, sequencer 152, and presentation modeler 140, as well as method 600, method 500, and method 200.

These and other software components may be loaded into memory 2004 of system 2000 using a drive mechanism (not shown) associated with a non-transitory computer-readable medium 2016, such as a DVD/CD-ROM drive, memory card, network download, or the like.

Memory 2004 also includes database 2014. In some embodiments, system 2000 may communicate with database 2014 via network interface 2008, a storage area network ("SAN"), a high-speed serial bus, and/or via the other suitable communication technology.

In some embodiments, database 2014 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

What is claimed is:

1. A method for operating a system for creating and retrieving contextual links between user interface (UI) objects comprising:
   operating a machine processor to display a navigation options menu as an overlay, above a content source, within a user interface on a machine display, in response to receiving an input control through a UI controller for a UI object;
   generating an annotation entry for the UI object by:
      displaying an input menu as the overlay, above the content source, within the user interface, in response to detecting an annotation control within the navigation options menu;
      receiving at least one user content control and a link classification through the input menu;
      storing the UI object within UI content storage and the at least one user content control and the link classification as the annotation entry within link description storage through operation of an allocator; and
      correlating the annotation entry and the UI object within a correlation table through operation of a correlator;
   generating a contextual link between a first UI object and a second UI object by:
      storing the first UI object in the UI content storage through operation of the allocator, in response to detecting a first link control through the navigation options menu;
      storing the second UI object in the UI content storage, through operation of the allocator, and displaying the input menu, in response to detecting a second link control through the navigation options menu;
      storing a contextual link description in the link description storage, through operation of the allocator, in response to receiving the at least one user content control and the link classification from the input menu; and
      correlating the contextual link description, the first UI object, and the second UI object in the correlation table through operation of the correlator; and
   displaying, on the machine display, an adjacently positioned link counter and a visible indicator around the UI object through operation of a presentation modeler, in response to detecting at least one correlation for the UI object in the correlation table.

2. The method of claim 1 further comprising:
displaying a content map as an overlay, above the content source, in the user interface by:
   receiving a content map control for the first UI object through the UI controller;
   configuring a selector with the content map control to identify correlations associated with the first UI object in the correlation table;
   retrieving UI objects from the UI content storage, and annotation entries and contextual link descriptions from the link description storage; and
   generating the content map comprising the contextual links and annotations, the contextual links each comprise the first UI object, the second UI object, and the contextual link description, the annotations each comprise the first UI object and the annotation entry.

3. The method of claim 1 further comprising:
displaying a user content menu as an overlay, above the content source, in the user interface by:
   receiving a user content menu control for the UI object through the UI controller;
   configuring a selector with the user content menu control to identify annotation entries associated with the UI object in the correlation table;
   retrieving the annotation entries from the link description storage;
   generating a presentation order for the annotation entries using the link classification through operation of a sequencer; and displaying at least one annotation entry, of the annotation entries, within the user content menu through operation of the presentation modeler configured by the presentation order.

4. The method of claim 3, wherein the sequencer utilizes historic interactions for selecting UI objects from the UI content storage and previous presentation orders to generate a current presentation order for the annotation entries in the user content menu.

5. The method of claim 1, wherein the second UI object is selected from a second content source.

6. The method of claim 1, wherein the link counter displays a number of correlations associated with the UI object in the correlation table.

7. The method of claim 1, wherein the UI object is a text string.

8. The method of claim 1, wherein the UI object is an image.

9. The method of claim 1, wherein the UI object is an area of the content source as displayed in the user interface.

10. The method of claim 1, wherein the UI object is an area of the content source as displayed in the user interface at an instance or interval during playback of a video.

11. The method of claim 1, wherein the correlation table is stored remotely on cloud storage.

\* \* \* \* \*